(12) United States Patent
Kubota et al.

(10) Patent No.: US 11,222,393 B2
(45) Date of Patent: Jan. 11, 2022

(54) INFORMATION PROCESSING APPARATUS, COMPUTER-READABLE RECORDING MEDIUM RECORDING IMAGE CONVERSION PROGRAM, AND IMAGE CONVERSION METHOD

(71) Applicant: FUJITSU LIMITED, Kawasaki (JP)

(72) Inventors: Tomonori Kubota, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 277 days.

(21) Appl. No.: 16/693,443

(22) Filed: Nov. 25, 2019

(65) Prior Publication Data

US 2020/0184593 A1    Jun. 11, 2020

(30) Foreign Application Priority Data

Dec. 7, 2018   (JP) .............................. JP2018-230109

(51) Int. Cl.
| | |
|---|---|
| *G06T 7/11* | (2017.01) |
| *G06T 7/50* | (2017.01) |
| *G06T 7/194* | (2017.01) |
| *G06T 1/20* | (2006.01) |
| *H04N 19/182* | (2014.01) |
| *H04N 19/176* | (2014.01) |
| *G06T 15/00* | (2011.01) |
| *H04N 19/86* | (2014.01) |

(Continued)

(52) U.S. Cl.
CPC ................. *G06T 1/20* (2013.01); *G06T 1/60* (2013.01); *G06T 7/11* (2017.01); *G06T 7/194* (2017.01); *G06T 7/50* (2017.01); *G06T 15/005* (2013.01); *H04N 19/176* (2014.11); *H04N 19/182* (2014.11); *H04N 19/436* (2014.11); *H04N 19/86* (2014.11); *G06T 2207/20041* (2013.01)

(58) Field of Classification Search
None
See application file for complete search history.

(56) References Cited

U.S. PATENT DOCUMENTS

| | | | |
|---|---|---|---|
| 2010/0231583 A1 | 9/2010 | Furukawa et al. | |
| 2011/0141121 A1* | 6/2011 | Sharp | G06T 5/30 |
| | | | 345/505 |

(Continued)

FOREIGN PATENT DOCUMENTS

| | | |
|---|---|---|
| JP | 2009-32122 A | 2/2009 |
| JP | 2015-68755 A | 4/2015 |

*Primary Examiner* — Joni Hsu
(74) *Attorney, Agent, or Firm* — Fujitsu Patent Center

(57) ABSTRACT

An information processing apparatus includes: a memory; and a processor coupled to the memory and configured to: partition pixel values in a unit of row of an input image into a plurality of sections and allocates threads to the respective sections of the row, the threads being enabled to run in parallel by a processor; calculate, with each of the threads allocated in each row, distances each from a pixel having a certain value in the corresponding section of the row in the input image, and generates a first distance image which stores values indicating the distances; and calculate, with each of the threads allocated in each row, a first boundary value indicating a distance from a pixel having the certain value in another section of each row, by using a calculation result of the first boundary value in the another section of each row.

12 Claims, 22 Drawing Sheets

(51) Int. Cl.
*H04N 19/436* (2014.01)
*G06T 1/60* (2006.01)

(56) References Cited

U.S. PATENT DOCUMENTS

2012/0020528 A1* 1/2012 Yamada .................... G06T 7/11
382/106
2016/0232653 A1 8/2016 Hishida et al.
2019/0347812 A1* 11/2019 Tan ........................... G06T 7/50

* cited by examiner

FIG. 5

| | COLUMN NUMBER | 0 | 1 | 2 | 3 | 4 | 5 | 6 | 7 |
|---|---|---|---|---|---|---|---|---|---|

COLUMN NUMBER OF COLUMN BEING PROCESSED

PIXEL BEING SCANNED

PROCESSING DIRECTION →

| Column | | 0 | 1 | 2 | 3 | 4 | 5 | 6 | 7 |
|---|---|---|---|---|---|---|---|---|---|
| 0 | INPUT IMAGE | [1] | 0 | 1 | 1 | 1 | 1 | 0 | 1 |
| | DISTANCE IMAGE | ∞ | | | | | | | |
| 1 | INPUT IMAGE | 1 | [0] | 1 | 1 | 1 | 1 | 0 | 1 |
| | DISTANCE IMAGE | ∞ | 0 | | | | | | |
| 2 | INPUT IMAGE | 1 | 0 | [1] | 1 | 1 | 1 | 0 | 1 |
| | DISTANCE IMAGE | ∞ | 0 | 1 | | | | | |
| 3 | INPUT IMAGE | 1 | 0 | 1 | [1] | 1 | 1 | 0 | 1 |
| | DISTANCE IMAGE | ∞ | 0 | 1 | 2 | | | | |
| ⋮ | | | | | | | | | |
| 7 | INPUT IMAGE | 1 | 0 | 1 | 1 | 1 | 1 | 0 | 1 |
| | DISTANCE IMAGE | ? | 0 | 1 | 2 | 3 | 4 | 0 | 1 |

FIG. 6

| | COLUMN NUMBER | 0 | 1 | 2 | 3 | 4 | 5 | 6 | 7 |
|---|---|---|---|---|---|---|---|---|---|

COLUMN NUMBER OF COLUMN BEING PROCESSED

← PROCESSING DIRECTION

7
DISTANCE IMAGE (BEFORE UPDATE): ? 0 1 2 3 4 0 [1]
DISTANCE IMAGE (AFTER UPDATE): 1

PIXEL BEING SCANNED

⋮

5
DISTANCE IMAGE (BEFORE UPDATE): ? 0 1 2 3 [4] 0 1
DISTANCE IMAGE (AFTER UPDATE): <u>1</u> 0 1

0+1

4
DISTANCE IMAGE (BEFORE UPDATE): ? 0 1 2 [3] 1 0 1
DISTANCE IMAGE (AFTER UPDATE): <u>2</u> 1 0 1

1+1

⋮

0
DISTANCE IMAGE (BEFORE UPDATE): ? 0 1 2 2 1 0 1
DISTANCE IMAGE (AFTER UPDATE): <u>1</u> 0 1 2 2 1 0 1

|  | ROW DIRECTION | COLUMN DIRECTION |
|---|---|---|
| FIRST RELATED ART | 2,160 | 3,840 |
| SECOND RELATED ART | 8,294,400 | 8,294,400 |

FullHD(1920×1088)

|  | ROW DIRECTION | COLUMN DIRECTION |
|---|---|---|
| FIRST RELATED ART | 1,088 | 1,920 |
| SECOND RELATED ART | 2,088,960 | 2,088,960 |

HD(1280×720)

|  | ROW DIRECTION | COLUMN DIRECTION |
|---|---|---|
| FIRST RELATED ART | 720 | 1,280 |
| SECOND RELATED ART | 921,600 | 921,600 |

FIG. 14

| | SECTION ID (THREAD ID) | 0 | 1 | ... | 8 | 9 | ... | 12 | 13 |
|---|---|---|---|---|---|---|---|---|---|
| | NUMBER OF PIXELS IN SECTION | E2 | E3 | | E8 | E3 | | E2 | E5 |
| | RIGHT BOUNDARY VALUE R(n) OF SECTION | E2 | E3 | | E8 | E3 | | E2 | E5 |
| INITIAL SETTING | INITIALIZE D(n) = ∞ (n: SECTION ID) | D0=∞ | D1=∞ | | | D9=∞ | | | D13=∞ |
| | THREAD ID > 0<br>LOAD RIGHT BOUNDARY VALUE<br>R(n – 1) + E TO D(n) | | D1=2+E<br>0 | | | D9=∞+E<br>8 | | | D13=2+E<br>12 |
| CALCULATION PROCESSING 1 | THREAD ID ≧ 2<br>D(n) = min(D(n),D(n-2)+E*2)<br>REFERRED SECTIONS | | --- | | | D9 = min(D9,D7+E*2)<br>8,[6] | | | D13 = min(D13,D11+E*2)<br>12,[10] |
| CALCULATION PROCESSING 2 | THREAD ID ≧ 4<br>D(n) = min(D(n),D(n-4)+E*4)<br>REFERRED SECTIONS | | --- | | | D9 = min(D9,D5+E*4)<br>12,10,[8,6] | | | D13 = min(D13,D9+E*4)<br>12,10,[8,6] |
| CALCULATION PROCESSING 3 | THREAD ID ≧ 8<br>D(n) = min(D(n),D(n-8)+E*8)<br>REFERRED SECTIONS | | --- | | | D9 = min(D9,D1+E*8)<br>8,6,4,2,[0] | | | D13 = min(D13,D5+E*8)<br>12,10,8,6[4,2,0] |
| CALCULATION PROCESSING 4 | THREAD ID ≧ 16<br>D(n) = min(D(n),D(n-16)+E*16)<br>REFERRED SECTIONS | | --- | | | --- | | | --- |
| CALCULATION PROCESSING 5 | THREAD ID ≧ 1<br>D(n) = min(D(n),D(n-1)-E)<br>REFERRED SECTIONS | | --- | | | D9 = min(D9,D8+E)-E<br>8,...,0 | | | D13 = min(D13,D12+E)-E<br>12,...,0 |

FIG. 15

| | | 14<br>E<br>4 | 15<br>E<br>2 | 16<br>E<br>3 | 17<br>E<br>1 | SECTION ID (THREAD ID)<br>NUMBER OF PIXELS IN SECTION<br>RIGHT BOUNDARY VALUE R(n) OF SECTION |
|---|---|---|---|---|---|---|
| INITIAL SETTING | | | $D15=\infty$ | $D16=\infty$ | $D17=\infty$ | INITIALIZE D(n) = $\infty$ (n: SECTION ID) |
| | | | $D15=4+E$<br>14 | $D16=2+E$<br>15 | $D17=3+E$<br>16 | THREAD ID > 0<br>LOAD RIGHT BOUNDARY VALUE<br>R(n − 1) + E TO D(n) |
| CALCULATION PROCESSING 1 | | | D15 = min(D15,D13+E*2)<br>14,[12] | D16 = min(D16,D14+E*2)<br>15,[13] | D17 = min(D17,D15+E*2)<br>16,[14] | THREAD ID ≧ 2<br>D(n) = min(D(n),D(n−2)+E*2)<br>REFERRED SECTIONS |
| CALCULATION PROCESSING 2 | | | D15 = min(D15,D11+E*4)<br>14,12,[10,8] | D16 = min(D16,D12+E*4)<br>15,13,[11,9] | D17 = min(D17,D13+E*4)<br>16,14,[12,10] | THREAD ID ≧ 4<br>D(n) = min(D(n),D(n−4)+E*4)<br>REFERRED SECTIONS |
| CALCULATION PROCESSING 3 | | ⋮ | D15 = min(D15,D7+E*8)<br>14,12,10,8,[6,4,2,0] | D16 = min(D16,D8+E*8)<br>15,13,11,9,[7,5,3,1] | D17 = min(D17,D9+E*8)<br>16,14,12,10,[8,6,4,2] | THREAD ID ≧ 8<br>D(n) = min(D(n),D(n−8)+E*8)<br>REFERRED SECTIONS |
| CALCULATION PROCESSING 4 | | | | D16 = min(D16,D0+E*16)<br>15,13,11,9,7,5,3,1 | D17 = min(D17,D1+E*16)<br>16,14,12,10,8,6,4,2,[0] | THREAD ID ≧ 16<br>D(n) = min(D(n),D(n−16)+E*16)<br>REFERRED SECTIONS |
| CALCULATION PROCESSING 5 | | | D15 = min(D15,D14+E)-E<br>14,…,0 | D16 = min(D16,D15+E)-E<br>15,…,0 | D17 = min(D17,D16+E)-E<br>16,…,0 | THREAD ID ≧ 1<br>D(n) = min(D(n),D(n−1))-E<br>REFERRED SECTIONS |

|  | ROW DIRECTION | COLUMN DIRECTION |
|---|---|---|
| FIRST RELATED ART | 2,160 | 3,840 |
| SECOND RELATED ART | 8,294,400 | 8,294,400 |
| EMBODIMENT | 69,120 | 122,880 |

FullHD(1920×1088)

|  | ROW DIRECTION | COLUMN DIRECTION |
|---|---|---|
| FIRST RELATED ART | 1,088 | 1,920 |
| SECOND RELATED ART | 2,088,960 | 2,088,960 |
| EMBODIMENT | 34,816 | 61,440 |

FullHD(1280×720)

|  | ROW DIRECTION | COLUMN DIRECTION |
|---|---|---|
| FIRST RELATED ART | 720 | 1,280 |
| SECOND RELATED ART | 921,600 | 921,600 |
| EMBODIMENT | 23,040 | 40,960 |

INFORMATION PROCESSING APPARATUS, COMPUTER-READABLE RECORDING MEDIUM RECORDING IMAGE CONVERSION PROGRAM, AND IMAGE CONVERSION METHOD

CROSS-REFERENCE TO RELATED APPLICATION

This application is based upon and claims the benefit of priority of the prior Japanese Patent Application No. 2018-230109, filed on Dec. 7, 2018, the entire contents of which are incorporated herein by reference.

FIELD

The embodiment discussed herein is related to an image conversion apparatus, a computer-readable recording medium, and an image conversion method.

BACKGROUND

Mask processing is processing for causing only a specific portion to be displayed and causing a portion other than the specific portion not to be displayed. By performing such mask processing, a binary image is generated in which 1 is stored in pixels in the specific portion and 0 is stored in pixels in the portion other than the specific portion, for example. A pixel in which 0 is stored is hereinafter referred to as a zero-pixel. A technique for calculating distances from individual pixels of the binary image to the nearest zero-pixel and generating a distance image storing the calculated distances is used. The generated distance image is used for separating regions in the image, for example.

As a related art, there has been proposed a technique for converting a binary image in terms of distance to create a distance image, performing closing processing on the binary image using the distance image, and extracting voids based on differences between the images before and after the closing processing.

As a related art, there has also been proposed an image processing apparatus that integrates a plurality of pieces of shape data representing a shape of an object.

Related art is disclosed in Japanese Laid-open Patent Publication No. 2015-68755 and Japanese Laid-open Patent Publication No. 2009-32122.

SUMMARY

According to an aspect of the embodiments, an information processing apparatus includes: a memory; and a processor coupled to the memory and configured to: partition pixel values in a unit of row of an input image into a plurality of sections and allocates threads to the respective sections of the row, the threads being enabled to run in parallel by a processor; calculate, with each of the threads allocated in each row, distances each from a pixel having a certain value in the corresponding section of the row in the input image, and generates a first distance image which stores values indicating the distances; calculate, with each of the threads allocated in each row, a first boundary value indicating a distance from a pixel having the certain value in another section of each row, by using a calculation result of the first boundary value in the another section of each row; output a second distance image obtained by updating, with each of the threads allocated in each row, each of the values in the first distance image to a smaller value among the value in the first distance image and a value indicating a distance from the pixel having the certain value calculated based on the first boundary values; partition pixel values in a unit of column of the second distance image into a plurality of sections and allocates threads to the respective sections of the column, the threads being enabled to run in parallel by the processor; calculate, with each of the threads allocated in each column, values indicating distances each from a pixel having the certain value in the corresponding section of the column based on pixel values in the second distance image, and generates a third distance image which stores the calculated values; calculate, with each of the threads allocated in each column, a second boundary value indicating a distance from a pixel having the certain value in another section of each column, by using a calculation result of the second boundary value in the another section of each column; and update, with each of the threads allocated in each column, each of the values in the third distance image to a smaller value among the value in the third distance image and a value indicating a distance from the pixel having the certain value calculated based on the second boundary values.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of processing performed by a first row forward scan unit;

FIG. 6 is a diagram illustrating an example of processing performed by a first row backward scan unit;

FIG. 9 is a diagram illustrating the numbers of processes executed in parallel in the first related art and the second related art;

FIG. 14 is a diagram (part 1) illustrating an example of processing performed by the row-direction reduction unit;

FIG. 15 is a diagram (part 2) illustrating an example of the processing performed by the row-direction reduction unit;

FIG. 21 is a diagram illustrating the numbers of processes executed in parallel in the first related art, the second related art, and the embodiment.

DESCRIPTION OF EMBODIMENTS

For example, a technique for converting a binary image in terms of distance to create a distance image, performing closing processing on the binary image using the distance image, and extracting voids based on differences between the images before and after the closing processing may be provided.

For example, an image processing apparatus that integrates a plurality of pieces of shape data representing a shape of an object may be provided.

As a method of converting a binary image into a distance image, a method for scanning pixels in each row and each column of the binary image to determine distances from a zero-pixel is conceivable. When this method is used, the number of processes executed in parallel is equal to the number of rows or the number of columns of the binary image if threads are allocated to respective rows and respective columns. Therefore, when a processor (for example, a graphics processing unit (GPU)) capable of executing many processes in parallel is used, the number of processes executable in parallel may not be effectively used.

A method for allocating threads to respective pixels and scanning each row and each column with the threads to determine distances from a zero-pixel is also conceivable. When this method is used, processing is performed in parallel on the individual pixels with the independent threads. Thus, the number of processes executable in parallel is effectively used. However, since a single pixel is accessed by a plurality of threads, an amount of access to each pixel increases.

In one aspect, image conversion with a small amount of access to each pixel may be performed while effectively using the number of processes executable in parallel by a processor.

The related art of image conversion processing according to an embodiment will be described below. For example, a Manhattan distance is used when distances from individual pixels of a binary image to the nearest zero-pixel are calculated and a distance image storing the calculated distances is generated. For example, a Manhattan distance $d(p, q)$ between a point $p(p_1, p_2, \ldots p_n)$ and a point $q(q_1, q_2, \ldots q_n)$ in n dimensions is calculated by using equation (1) below.

$$d(p, q) = \sum_{k=1}^{n} (|p_k - q_k|) \quad (1)$$

A Manhattan distance between a point $p(p_1, p_2)$ and a point $q(q_1, q_2)$ in two dimensions is calculated by using equation (2) below.

$$d(p,q)=|p_2-q_2|+|p_1-p_2| \quad (2)$$

Figure 1A:
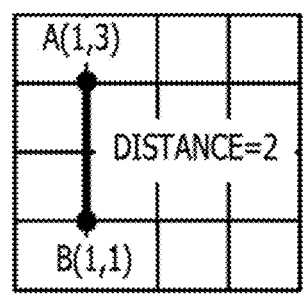
FIGS. 1A and 1B are diagrams each illustrating an example of a Manhattan distance in two dimensions.
Figure 1B:
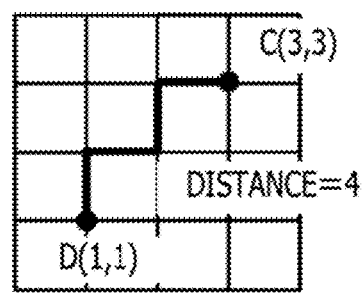

FIGS. 1A and 1B illustrate examples of the Manhattan distance in two dimensions. In FIG. 1A, a distance between a point A(1, 3) and a point B(1, 1) is equal to 2 when being calculated based on equation (2) above. In FIG. 1B, a distance between a point C(3, 3) and a point D(1, 1) is equal to 4 when being calculated based on equation (2) above.

In the following description, the Manhattan distance described above is used as a distance between pixels. In the following description, the Manhattan distance may be simply referred to as a "distance" in some cases.

Figure 2:
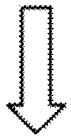
FIG. 2 is a diagram illustrating an example in which an input image that has been subjected to mask processing is converted into a distance image.

FIG. 2 is a diagram illustrating an example in which an input image that has been subjected to mask processing is converted into a distance image. The input image illustrated in FIG. 2 is a binary image in which 1 is stored in each pixel representing a foreground and 0 is stored in each pixel representing a background in the image. In FIG. 2, a distance image is generated by performing image conversion processing for setting a distance from a certain pixel to the nearest zero-pixel as a pixel value of the certain pixel.

Figure 3:
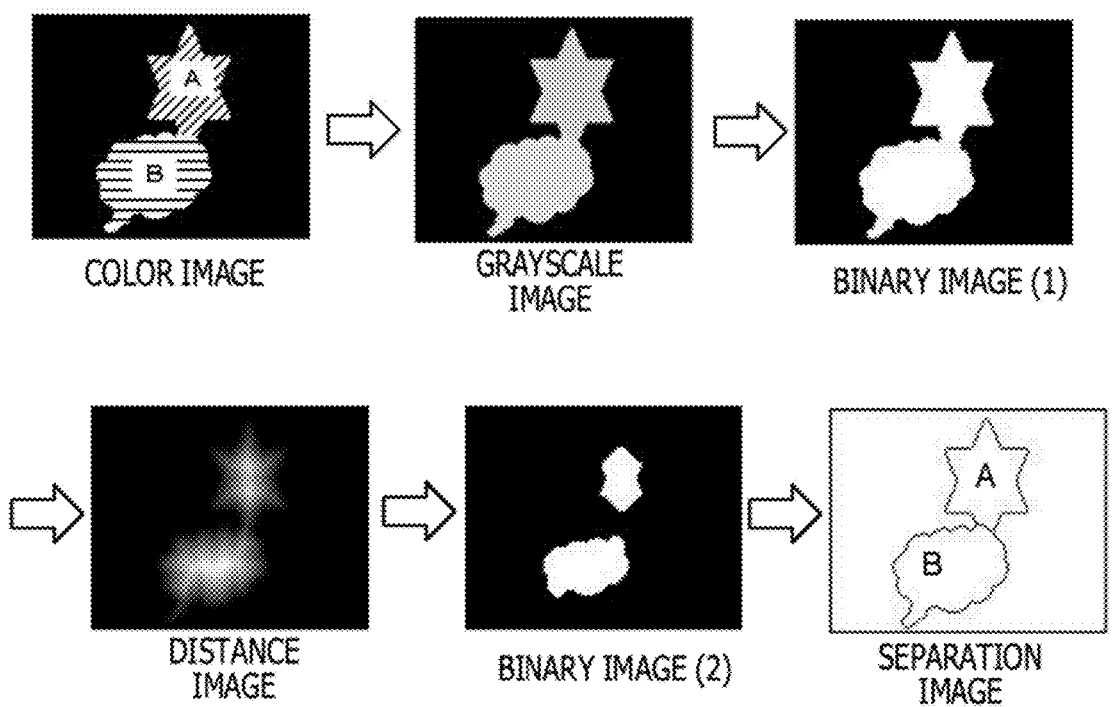
FIG. 3 is a diagram illustrating an example of region separation.

FIG. 3 is a diagram illustrating an example of region separation. In the example illustrated in FIG. 3, a color image including a region A and a region B is used as an input image. It is assumed that a boundary between the region A and the region B is not clear in the color image.

In the case where the region A is separated from the region B, the color image is first converted into a grayscale image. The grayscale image is then converted into a binary image (1). The binary image (1) is then converted into a distance image storing distances from individual pixels to the nearest zero-pixel. The distance image is then converted into a binary image (2) in which, for example, each pixel storing a value equal to or greater than a certain value is displayed in black and each pixel storing a value less than the certain value is displayed in white. Then, for example, labeling is performed for each pixel of the binary image (2) and the watershed algorithm is applied. Consequently, the boundary between the region A and the region B becomes clear. For example, a separation image in which the region A and the region B are separated from each other is generated.

The related art to be compared with image conversion processing according to the embodiment will be described next. The related art described below is a technique related to image conversion from the binary image (1) to the distance image in the image conversion illustrated in FIG. 3.

Figure 4:
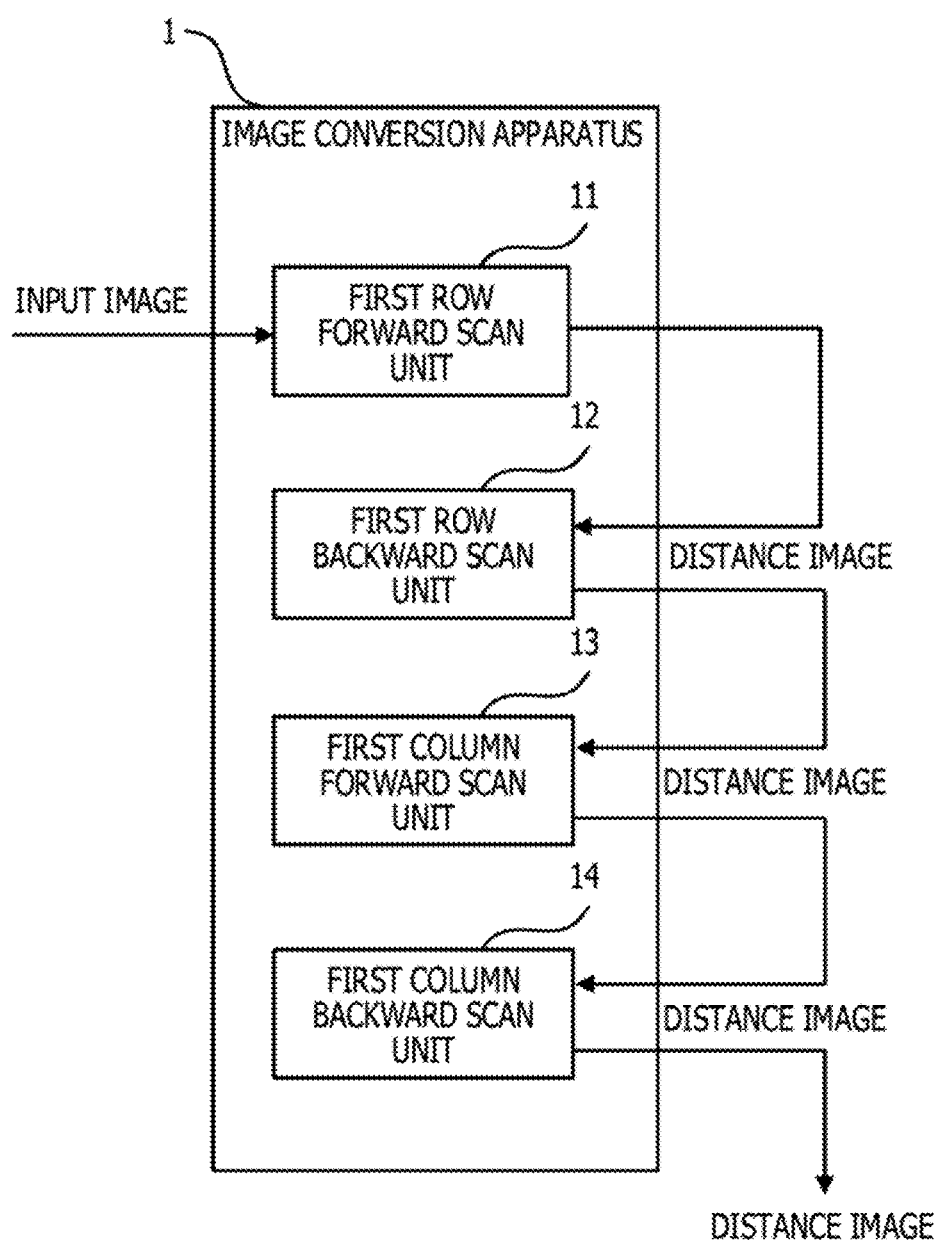
FIG. 4 is a diagram illustrating an image conversion apparatus according to a first related art.

FIG. 4 is a diagram illustrating an image conversion apparatus 1 according to a first related art. The image conversion apparatus 1 includes a first row forward scan unit 11, a first row backward scan unit 12, a first column forward scan unit 13, and a first column backward scan unit 14. In the following description, it is assumed that a direction from the left end to the right end of an image is referred to as a forward direction and the direction from the right end to the left end of the image is referred to as a backward direction.

The first row forward scan unit 11 performs a forward scan on each row of an input image (binary image) to generate a distance image in which a distance from each pixel being scanned to the nearest zero-pixel is set as a pixel value of the pixel being scanned. The first row forward scan unit 11 then outputs the distance image to the first row backward scan unit 12.

The first row backward scan unit 12 performs a backward scan on each row of the distance image acquired from the first row forward scan unit 11. The first row backward scan unit 12 then stores a smaller value among a value obtained by adding 1 to the pixel value of the pixel scanned immediately before the pixel being scanned and the pixel value of the pixel being scanned in the distance image acquired from the first row forward scan unit 11, as a pixel value in a new distance image. The first row backward scan unit 12 then outputs the new distance image to the first column forward scan unit 13.

Each of the first row forward scan unit 11 and the first row backward scan unit 12 performs the processing for each of the rows in parallel.

The first column forward scan unit 13 performs a forward scan on each column of the distance image acquired from the first row backward scan unit 12. The first column forward scan unit 13 stores a smaller value among a value obtained by adding 1 to the pixel value of the pixel scanned immediately before the pixel being scanned and the pixel value of the pixel being scanned in the distance image acquired from the first row backward scan unit 12, as a pixel value in a new distance image. The first column forward scan unit 13 then outputs the new distance image to the first column backward scan unit 14.

The first column backward scan unit 14 performs a backward scan on each column of the distance image acquired from the first column forward scan unit 13. The first column backward scan unit 14 stores a smaller value among a value obtained by adding 1 to the pixel value of the pixel scanned immediately before the pixel being scanned and the pixel value of the pixel being scanned in the distance image acquired from the first column forward scan unit 13, as a pixel value in a new distance image. The first column backward scan unit 14 then outputs the new distance image as a distance image based on the input image.

Each of the first column forward scan unit 13 and the first column backward scan unit 14 performs the processing for each of the columns in parallel.

FIG. 5 is a diagram illustrating an example of the processing performed by the first row forward scan unit 11. The first row forward scan unit 11 performs a forward scan on each row of the input image to generate a distance image in which a distance from each pixel to the nearest zero-pixel is set as a pixel value of the pixel. The first row forward scan unit 11 performs a scan on pixels one by one from the left end of the input image. FIG. 5 illustrates an example in which a certain row of the input image is converted into a distance image.

In a column assigned the column number 0 in the certain row, the first row forward scan unit 11 sets an indefinite value (∞) as a pixel value in the distance image because the previous column does not exist. In a column assigned the column number 1 in the certain row, the pixel value of the pixel being scanned in the input image is equal to 0. Thus, the first row forward scan unit 11 stores 0 as a pixel value in the distance image. In a column assigned the column number 2 in the certain row, the pixel value of the pixel being scanned in the input image is equal to 1 (non-zero). Thus, the first row forward scan unit 11 stores 1, which is a distance from the zero-pixel that is present in the column assigned the column number 1, as a pixel value in the distance image. In a column assigned the column number 3 in the certain row, the pixel value of the pixel being scanned in the input image is equal to 1 (non-zero). Thus, the first row forward scan unit 11 stores 2, which is a distance from the zero-pixel that is present in the column assigned the column number 1, as a pixel value in the distance image.

The first row forward scan unit 11 continues substantially the same processing to the last column and performs substantially the same processing for all rows to convert the input image into the distance image.

FIG. 6 is a diagram illustrating an example of the processing performed by the first row backward scan unit 12. The first row backward scan unit 12 stores a smaller value among a value obtained by adding 1 to the pixel value of the pixel scanned immediately before the pixel being scanned and the pixel value of the pixel being scanned in the distance image acquired from the first row forward scan unit 11, as a pixel value in a new distance image. The first row backward scan unit 12 performs a scan on pixels one by one from the right end of the input image.

Since there is no pixel that is scanned immediately before the pixel being scanned in a column assigned the column number 7, the first row backward scan unit 12 does not change the pixel value in the distance image. In a column assigned the column number 5, the first row backward scan unit 12 stores, in a distance image (after updating), 1 which is a smaller value among the pixel value (4) of the pixel being scanned in the distance image (before updating) and the value (1) obtained by adding 1 to the pixel value (0) of the pixel scanned immediately before the pixel being scanned. In a column assigned the column number 4, the first row backward scan unit 12 stores, in the distance image (after updating), 2 which is a smaller value among the pixel value (3) of the pixel being scanned in the distance image (before updating) and the value (2) obtained by adding 1 to the pixel value (1) scanned immediately before the pixel being scanned.

The first row backward scan unit 12 continues substantially the same processing to the last column to update the pixel values in the certain row in the distance image. The first row backward scan unit 12 performs substantially the same processing for all the rows to update the distance image.

Since the processing performed by the first column forward scan unit 13 and the first column backward scan unit 14 is substantially the same as that of the first row backward scan unit 12, a detailed description thereof will be omitted.

Through the processing described above, the image conversion apparatus 1 converts the input image (binary image) into the distance image. As illustrated in the example of FIG. 2, a distance image is an image in which a distance from a pixel of interest to the nearest zero-pixel is set as the pixel value of the pixel of interest.

In the first related art, the number of processes executed in parallel by the first row forward scan unit 11 and the first row backward scan unit 12 is equal to the number of rows of the input image. The number of processes executed in parallel by the first column forward scan unit 13 and the first column backward scan unit 14 is equal to the number of columns of the input image. Therefore, when a GPU capable of executing many processes in parallel is used, the number of processes executed in parallel in the image conversion processing according to the first related art is less than the number of processes executable in parallel by the GPU. Consequently, the number of processes executable in parallel may not be effectively used.

Figure 7:
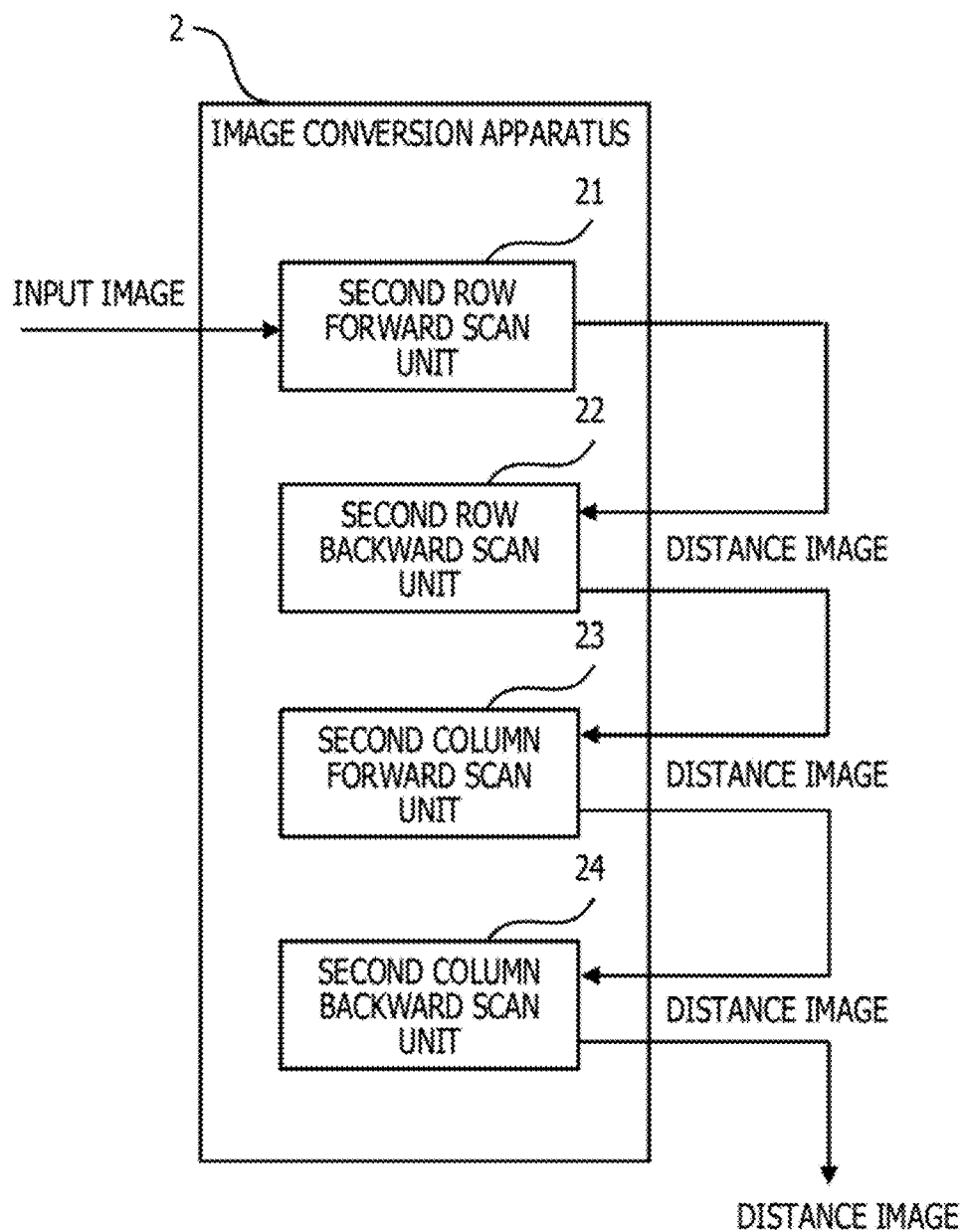
FIG. 7 is a diagram illustrating an image conversion apparatus according to a second related art.

FIG. 7 is a diagram illustrating an image conversion apparatus 2 according to a second related art. The image conversion apparatus 2 includes a second row forward scan unit 21, a second row backward scan unit 22, a second column forward scan unit 23, and a second column backward scan unit 24. Processing performed by the image conversion apparatus 2 differs from the processing according to the first related art in that scanning is performed by allocating threads to respective pixels.

The second row forward scan unit 21 copies each row of an input image to a shared memory and performs a forward scan on each pixel. Upon finding the first zero-pixel by performing a scan from a certain pixel, the second row forward scan unit 21 stores the number of pixels that have been scanned, as a pixel value of the certain pixel. After storing the pixel values corresponding to all the pixels of the input image in the distance image, the second row forward scan unit 21 outputs the distance image to the second row backward scan unit 22.

The second row backward scan unit 22 copies each row of the distance image acquired from the second row forward scan unit 21 to the shared memory and performs a backward scan on each pixel. Upon finding the first zero-pixel by performing a scan from a certain pixel, the second row backward scan unit 22 stores a smaller value among the number of pixels that have been scanned from the certain pixel and a pixel value in the distance image acquired from the second row forward scan unit 21, as a pixel value in an updated distance image. After updating all the pixels of the acquired distance image, the second row backward scan unit 22 outputs the updated distance image to the second column forward scan unit 23.

The processing performed by the second column forward scan unit 23 and the second column backward scan unit 24 is substantially the same as the processing performed by the second row forward scan unit 21 and the second row backward scan unit 22, respectively.

Figure 8:
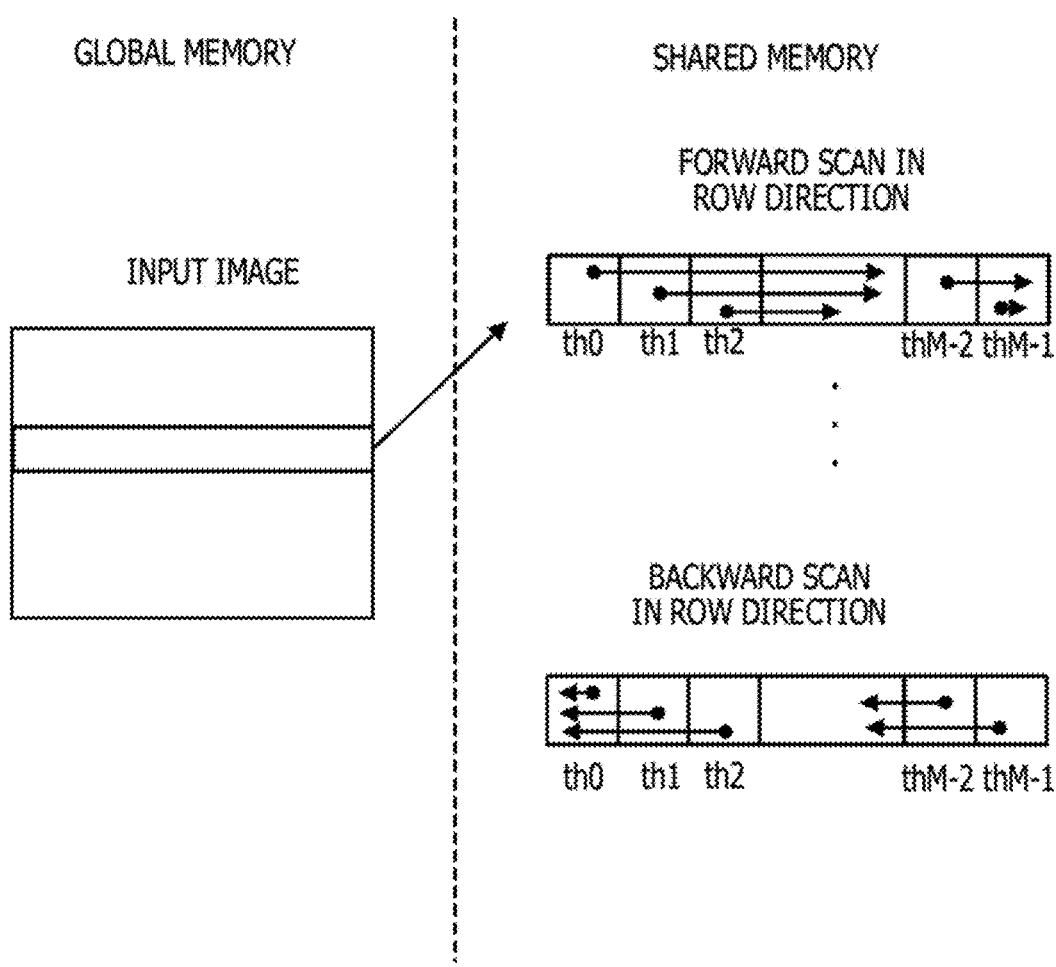
FIG. 8 is a diagram illustrating an overview of an image conversion processing according to the second related art.

FIG. 8 is a diagram illustrating an overview of the image conversion processing according to the second related art. The second row forward scan unit 21 copies each row of the input image stored in a global memory to the shared memory and performs a forward scan on each pixel. As illustrated in FIG. 8, the second row forward scan unit 21 performs parallel processing with threads (threads th0, th1, . . . thM−1), the number of which is equal to the number of columns. Likewise, the second row backward scan unit 22 copies each column of the distance image output by the second row forward scan unit 21 to the shared memory and performs a backward scan on each pixel. As illustrated in FIG. 8, the second row backward scan unit 22 performs parallel processing with threads (threads th0, th1, . . . thM−1), the number of which is equal to the number of columns.

Likewise, the second column forward scan unit 23 and the second column backward scan unit 24 copy each column of the distance image to the shared memory and perform a scan on each pixel.

In the second related art, since the threads are allocated to the respective pixels and parallel processing is performed, the number of processes executed in parallel is large. Consequently, the number of processes executable in parallel by the GPU may be effectively used. However, as illustrated in FIG. 8, there is a possibility that a single pixel is scanned by a plurality of threads. Consequently, an amount of calculation and the number of times of access to each pixel are greater than those of the first related art.

FIG. 9 is a diagram illustrating the numbers of processes executed in parallel in the first related art and the second related art. FIG. 9 illustrates the numbers of processes executed in parallel in the row direction and the column direction in the case where an image of 4K (3840×2160), an image of full high definition (HD) (1920×1080), and an image of HD (1280×720) are converted by using the first related art and the second related art. In the first related art, the number of processes executed in parallel in the row direction is equal to the number of rows in the input image, and the number of processes executed in parallel in the column direction is equal to the number of columns in the input image. In the second related art, the number of processes executed in parallel in the row direction and in the column direction is equal to the number of rows×the number of columns in the input image.

For example, in the case where a GPU used includes 3584 cores, the number of processes executable in parallel is equal to 3584. In this case, in the first related art, the number of processes executable in parallel is not effectively used except for the column-direction processing of the image of 4K. On the other hand, the number of processes executable in parallel by the GPU used is effectively used in the second related art. However, the amount of calculation and the number of times of access to each pixel are greater than those of the first related art as described above.

Figure 10:
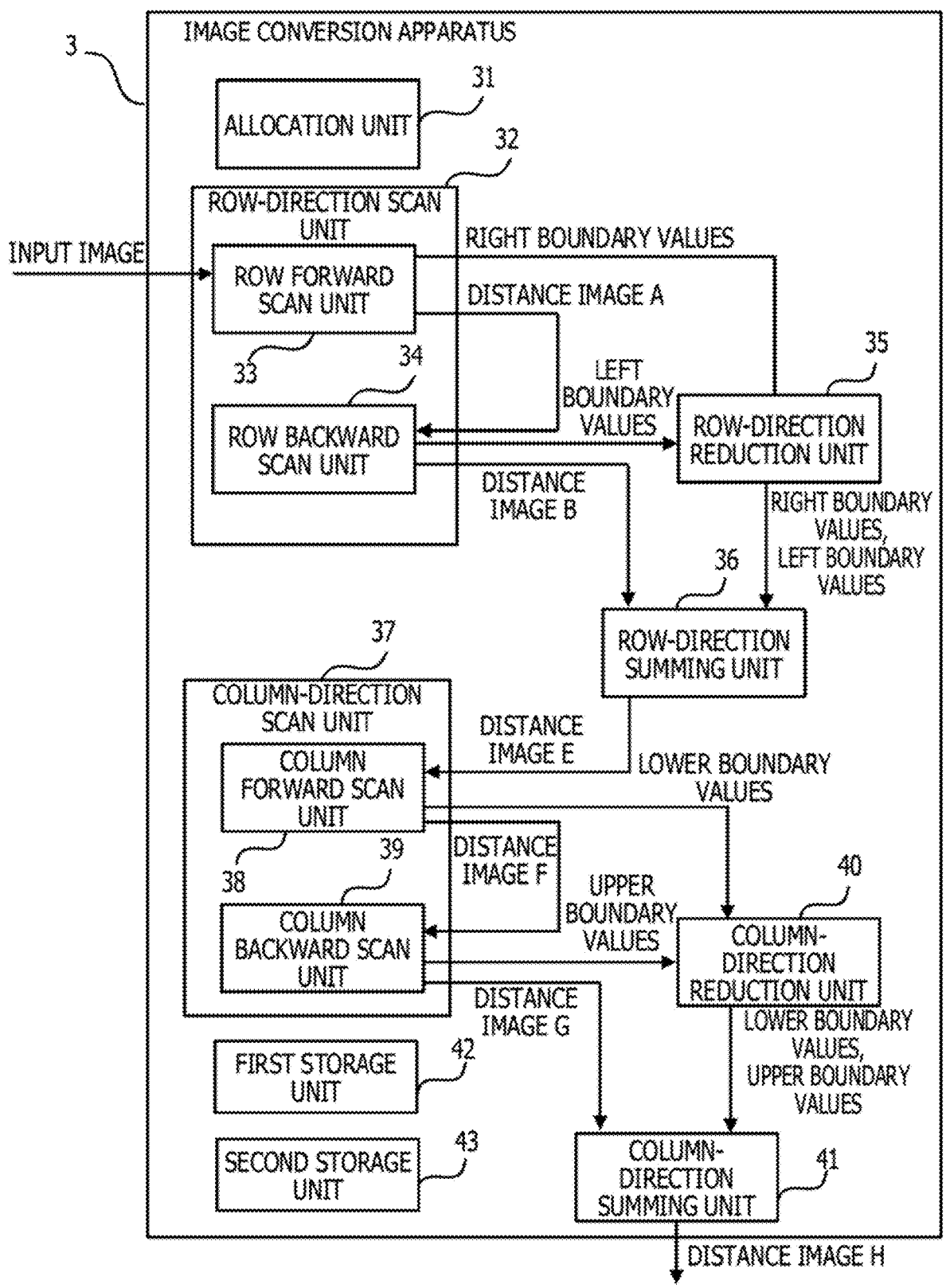
FIG. 10 is a diagram illustrating an example of a functional configuration of an image conversion apparatus according to an embodiment.

An embodiment will be described below with reference to the accompanying drawings. FIG. 10 is a diagram illustrating an example of a functional configuration of an image conversion apparatus 3 according to the embodiment. The image conversion apparatus 3 includes an allocation unit 31, a row-direction scan unit 32, a row-direction reduction unit 35, a row-direction summing unit 36, a column-direction scan unit 37, a column-direction reduction unit 40, a column-direction summing unit 41, a first storage unit 42, and a second storage unit 43. The image conversion apparatus 3 is an example of a computer. It is assumed that a GPU is used as a processor of the image conversion apparatus 3.

The allocation unit 31 partitions pixel values in a unit of row of an input image into a plurality of sections, and allocates threads to the respective sections of the row. The processor is capable of running the threads in parallel. The allocation unit 31 is an example of a first allocation unit and a second allocation unit.

The row-direction scan unit 32 includes a row forward scan unit 33 and a row backward scan unit 34. With each of the threads allocated in each row, the row-direction scan unit 32 calculates distances each from a pixel having a certain value in the corresponding section of the row in the input image, and generates a distance image B storing values indicating the distances. The row-direction scan unit 32 also calculates boundary values each indicating a distance from a pixel having the certain value in another section. In this embodiment, a zero-pixel is used as the pixel having the certain value. The row-direction scan unit 32 is an example of a first generation unit. The distance image B is an example of a first distance image.

The row forward scan unit 33 performs a forward scan for each section of the input image to calculate distances from the zero-pixel in each section of the input image, and stores the calculation results as pixel values in a distance image A. The row forward scan unit 33 stores a value obtained by adding 1 to the pixel value at the right end of each section as a right boundary value of the section. The row forward scan unit 33 outputs the distance image A to the row backward scan unit 34, and outputs the right boundary values to the row-direction reduction unit 35.

The row backward scan unit 34 performs a backward scan on the pixels in each section of the distance image A acquired from the row forward scan unit 33. The row backward scan unit 34 stores a smaller value among a value obtained by adding 1 to the pixel value of the pixel scanned immediately before the pixel being scanned and the pixel value of the pixel being scanned in the distance image A, as a pixel value in the new distance image B. The row backward scan unit 34 stores a value obtained by adding 1 to the pixel value at the left end of each section as a left boundary value of the section. The row backward scan unit 34 outputs the left boundary values to the row-direction reduction unit 35, and outputs the distance image B to the row-direction summing unit 36.

The row-direction reduction unit 35 calculates, with each of the threads allocated in each row, a first boundary value indicating a distance from a zero-pixel in another section of each row, by using the calculation results of the first boundary values in the other sections of each row. For example, the row-direction reduction unit 35 stores a smaller value among the first boundary value in a certain section and the minimum value of values each obtained by adding a distance from another section to the certain section of each row to the first boundary value of the another section of each row, as a new first boundary value of the certain section in the row. The first boundary value in the certain section is a value obtained by adding 1 to the pixel value at the end of the certain section of the row. The first boundary value is, for example, a right boundary value or a left boundary value.

For example, the row-direction reduction unit 35 stores, for example, a smaller value among the current right boundary value of a certain section and the minimum value of values each obtained by adding a distance from another section (a section on the left side of the certain section) to the certain section to the right boundary value of the other section, as a new right boundary value of the certain section. The row-direction reduction unit 35 stores, for example, a smaller value among the current left boundary value of a certain section and the minimum value of values each obtained by adding a distance from another section (a section on the right side of the certain section) to the certain section to the left boundary value of the other section, as a new left boundary value of the certain section. The row-direction reduction unit 35 is an example of a first calculation unit.

The row-direction summing unit 36 updates, with each of the threads allocated in each row, each of the values in the distance image B acquired from the row backward scan unit 34 to a smaller value among the value in the distance image and a value indicating a distance, from a zero-pixel in a scope of the entire row, calculated based on the boundary values (the right boundary values and the left boundary values). The row-direction summing unit 36 outputs a distance image E resulting from the updating. The row-direction summing unit 36 is an example of a first updating unit. The distance image E is an example of a second distance image.

The allocation unit 31 partitions pixel values in each column of the distance image E output by the row-direction summing unit 36 into a plurality of sections and allocates threads to the respective sections of the column. The processor is capable of running the threads in parallel.

The column-direction scan unit 37 includes a column forward scan unit 38 and a column backward scan unit 39. The column-direction scan unit 37 acquires the distance image E output by the row-direction summing unit 36. With each of the threads allocated in each column, the column-direction scan unit 37 calculates values indicating distances each from a pixel having a certain value in the corresponding section of the column based on the pixel values in the distance image E, and generates a distance image G storing the calculated values. The column-direction scan unit 37 is an example of a second generation unit. The distance image G is an example of a third distance image.

The column forward scan unit 38 performs a forward scan on pixels in each section of the distance image E acquired from the row-direction summing unit 36. The column forward scan unit 38 stores a smaller value among a value obtained by adding 1 to the pixel value of the pixel scanned immediately before the pixel being scanned and the pixel value of the pixel being scanned in the distance image E, as a pixel value in a new distance image F. The column forward scan unit 38 stores a value obtained by adding 1 to the pixel value at the lower end of each section, as a lower boundary value of the section. The column forward scan unit 38 outputs the distance image F to the column backward scan unit 39, and outputs the lower boundary values to the column-direction reduction unit 40.

The column backward scan unit 39 performs a backward scan on pixels in each section of the distance image F acquired from the column forward scan unit 38. The column backward scan unit 39 stores a smaller value among a value obtained by adding 1 to the pixel value of the pixel scanned immediately before the pixel being scanned and the pixel value of the pixel being scanned in the distance image F, as a pixel value in the new distance image G. The column backward scan unit 39 stores a value obtained by adding 1 to the pixel value at the upper end of each section, as an upper boundary value of the section. The column backward scan unit 39 outputs the distance image G to the column-direction summing unit 41, and outputs the upper boundary values to the column-direction reduction unit 40.

The column-direction reduction unit 40 calculates, with each of the threads allocated in each column, a second boundary value indicating a distance from a zero-pixel in another section of each column, by using calculation results of the second boundary values in the other sections of each column. For example, the column-direction reduction unit 40 stores a smaller value among the second boundary value in a certain section and a minimum value of values each obtained by adding a distance from another section to the certain section in each column to the second boundary value of the another section in the column, as a new second boundary value of the certain section in the column. The second boundary value in the certain section is a value obtained by adding 1 to the pixel value at the end of the certain section in the column. The second boundary value may be, for example, a lower boundary value or an upper boundary value.

For example, the column-direction reduction unit 40 stores, for example, a smaller value among the current lower boundary value of a certain section and the minimum value of values each obtained by adding a distance from another section (a section on the upper side of the certain section) to the certain section to the lower boundary value of the another section, as the new lower boundary value of the certain section. The column-direction reduction unit 40 stores, for example, a smaller value among the current upper boundary value of a certain section and the minimum value of values each obtained by adding a distance from another section (a section on the lower side of the certain section) to the certain section to the upper boundary value of the another section, as the new upper boundary value of the certain section. The column-direction reduction unit 40 is an example of a second calculation unit.

The column-direction summing unit 41 outputs a distance image H obtained by updating, with each of the threads allocated in each column, each of the values in the distance image G to a smaller value among the value in the distance image G acquired from the column backward scan unit 39 and a value indicating a distance from the zero-pixel calculated based on the boundary values (the lower boundary values and the upper boundary values). For example, the column-direction summing unit 41 may transmit the distance image H to another information processing apparatus or the like coupled to the image conversion apparatus 3, or may transmit the distance image H to a display device to display the distance image H thereon. The column-direction summing unit 41 is an example of a second updating unit.

The first storage unit 42 is, for example, a register included in the GPU. The first storage unit 42 is used for storing various kinds of data used in the processing performed by the row-direction reduction unit 35 and the column-direction reduction unit 40 and for exchanging data between the threads.

The second storage unit 43 includes, for example, a shared memory, a global memory, and the like included in the GPU and a memory outside the GPU. The second storage unit 43 is used for storing various kinds of data (such as the distance images and the boundary values) relating to the processing performed by the constituents other than the row-direction reduction unit 35 and the column-direction reduction unit 40 and for exchanging data between the threads.

Figure 11:
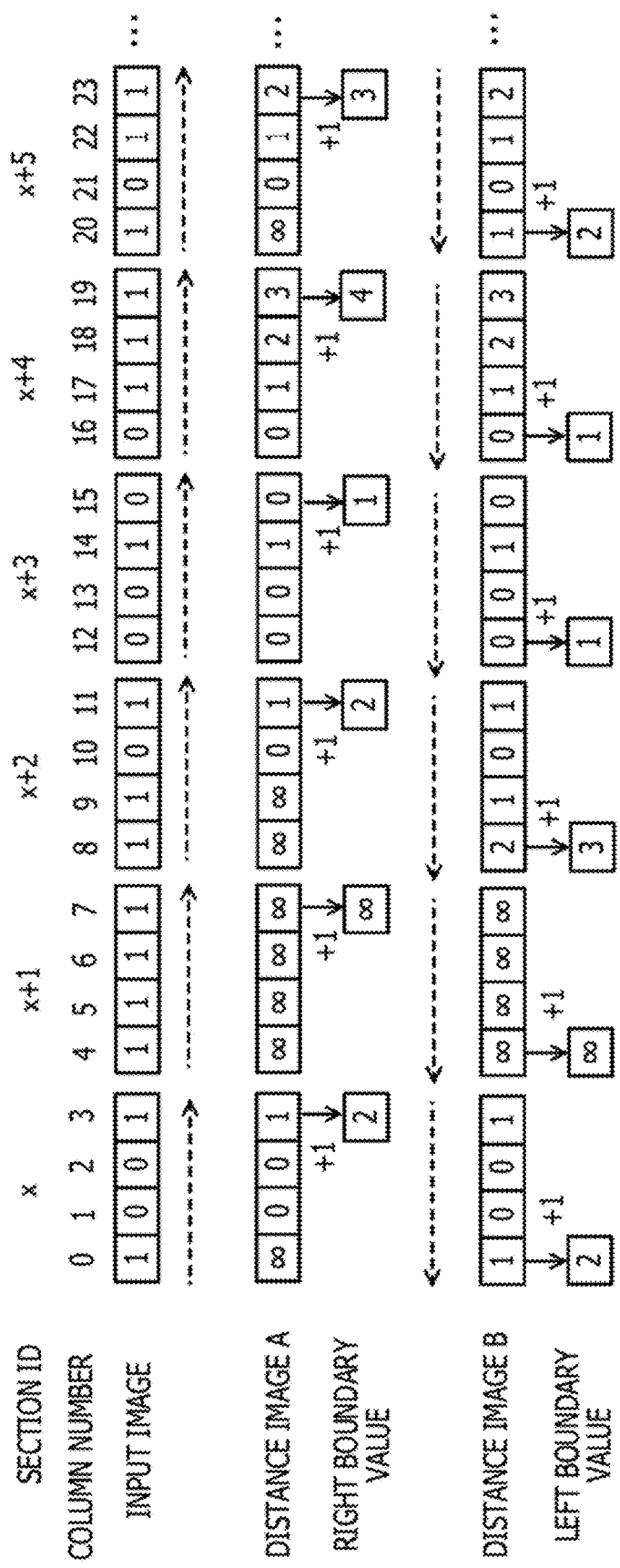
FIG. 11 is a diagram illustrating an example of row-direction scan processing.

FIG. 11 is a diagram illustrating an example of the row-direction scan processing. The allocation unit 31 partitions pixel values in a unit of row of the input image into a plurality of sections and allocates threads to the respective sections in the row. In the embodiment, the allocation unit 31 partitions pixel values of the input image into 32 sections. However, the number of sections and the number of threads do not have to be 32. FIG. 11 illustrates processing performed on sections from a section x to a section x+5. For example, a thread x performs calculation processing relating to the section x. The individual threads perform the processing in parallel.

The row forward scan unit 33 performs a forward scan for each section of the input image to calculate distances from the zero-pixel in each section of the input image, and stores the calculation results as pixel values in the distance image A. When there is no zero-pixel preceding the pixel being scanned in the input image, the row forward scan unit 33 stores an indefinite value ($\infty$) as a pixel value in the distance image A.

For example, in a column assigned the column number 0, there is no zero-pixel preceding the pixel being scanned. Thus, the row forward scan unit 33 stores $\infty$ as the pixel value in the distance image A. In columns assigned the column numbers 1 and 2, the pixels in the input image are zero-pixels. Thus, the row forward scan unit 33 stores 0 as the pixel values in the distance image A. In a column assigned the column number 3, a distance from the zero-pixel in the input image is equal to 1. Thus, the row forward scan unit 33 stores 1 as the pixel value in the distance image A. For example, the row forward scan unit 33 performs, for each section, substantially the same processing as the first row forward scan unit 11 according to the first related art.

Likewise, the row forward scan unit 33 performs a forward scan for each section, and stores the pixel values in the distance image A. The row forward scan unit 33 stores a value obtained by adding 1 to the pixel value at the right end of each section as a right boundary value of the section.

When reading the input image, the row forward scan unit 33 may read the input image to the shared memory in units of rows and perform a scan in the shared memory as in the example illustrated in FIG. 8.

The row backward scan unit 34 performs a backward scan on the pixels in each section of the distance image A acquired from the row forward scan unit 33. The row backward scan unit 34 stores a smaller value among a value obtained by adding 1 to the pixel value of the pixel scanned immediately before the pixel being scanned and the pixel value of the pixel being scanned in the distance image A, as a pixel value in the new distance image B. For example, the row backward scan unit 34 performs, for each section, substantially the same processing as the first row backward scan unit 12 according to the first related art.

For example, there is no pixel scanned immediately before the pixel being scanned in a column assigned the column number 23. Thus, the row backward scan unit 34 stores the pixel value of the distance image A as the pixel value in the new distance image B. In a column assigned the column number 22, the row backward scan unit 34 stores 1 which is a smaller value among a value (3) obtained by adding 1 to the pixel value (2) of the pixel scanned immediately before the pixel being scanned and the pixel value (1) of the pixel being scanned in the distance image A, as the pixel value in the new distance image B. In a column assigned the column number 21, the row backward scan unit 34 stores 0 which is a smaller value among a value (2) obtained by adding 1 to the pixel value (1) of the pixel scanned immediately before the pixel being scanned and the pixel value (0) of the pixel being scanned in the distance image A, as the pixel value in the new distance image B.

In a column assigned the column number 20, the row backward scan unit 34 stores 1 which is a smaller value among the value (1) obtained by adding 1 to the pixel value (0) of the pixel scanned immediately before the pixel being scanned and the pixel value ($\infty$) of the pixel being scanned in the distance image A, as the pixel value in the new distance image B.

Likewise, the row backward scan unit 34 performs a backward scan for each section, and stores the pixel values in the distance image B. The row backward scan unit 34 stores a value obtained by adding 1 to the pixel value at the left end of each section as a left boundary value of the section.

Figure 12:
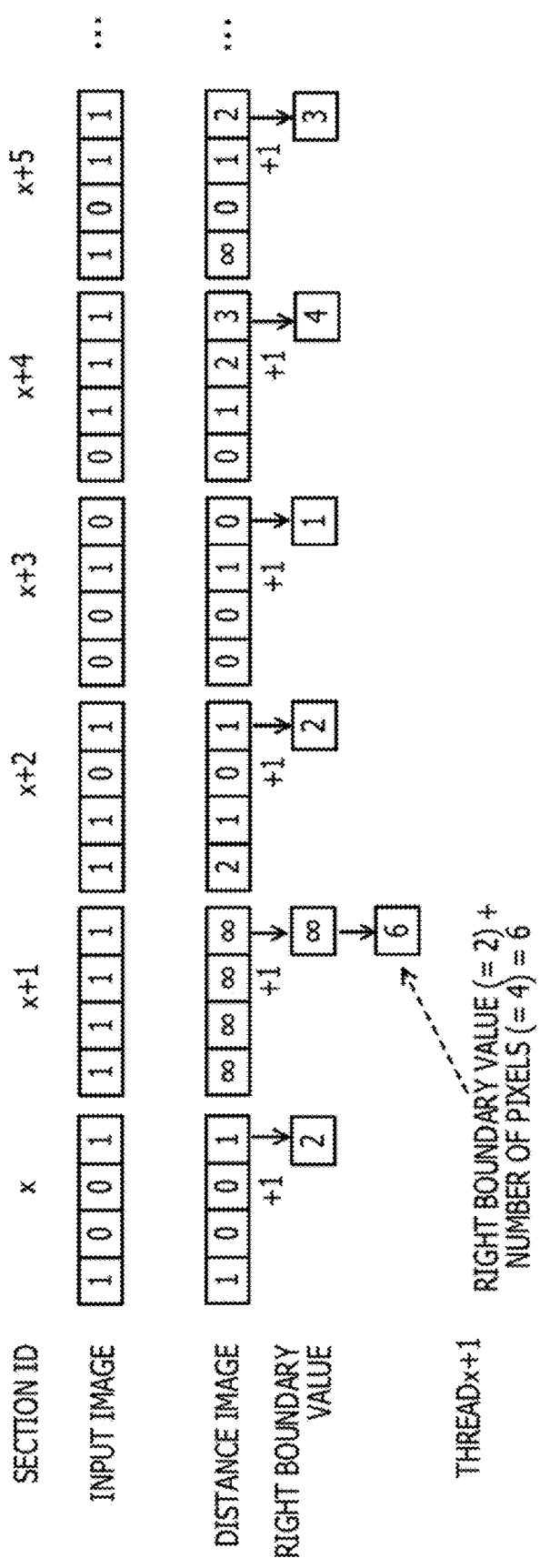
FIG. 12 is a diagram illustrating an example of calculation of right boundary values performed by a row-direction reduction unit.

FIG. 12 is a diagram illustrating an example of calculation of the right boundary values performed by the row-direction reduction unit 35. The row-direction reduction unit 35 stores a smaller value among the current right boundary value of a certain section and the minimum value of values each obtained by adding a distance from another section (a section on the left side of the certain section) to the certain section to the right boundary value of the another section, as a new right boundary value of the certain section.

For example, for a section x+1, the row-direction reduction unit 35 stores 6 which is a smaller value among the value (6) obtained by adding the distance (4) to the right boundary value (2) of the section x and the current right boundary value ($\infty$), as the new right boundary value.

In the example illustrated in FIG. 12, the row-direction reduction unit 35 updates only the right boundary value of the section x+1. However, the row-direction reduction unit 35 updates the right boundary values of the another sections by performing substantially the same processing.

Figure 13:
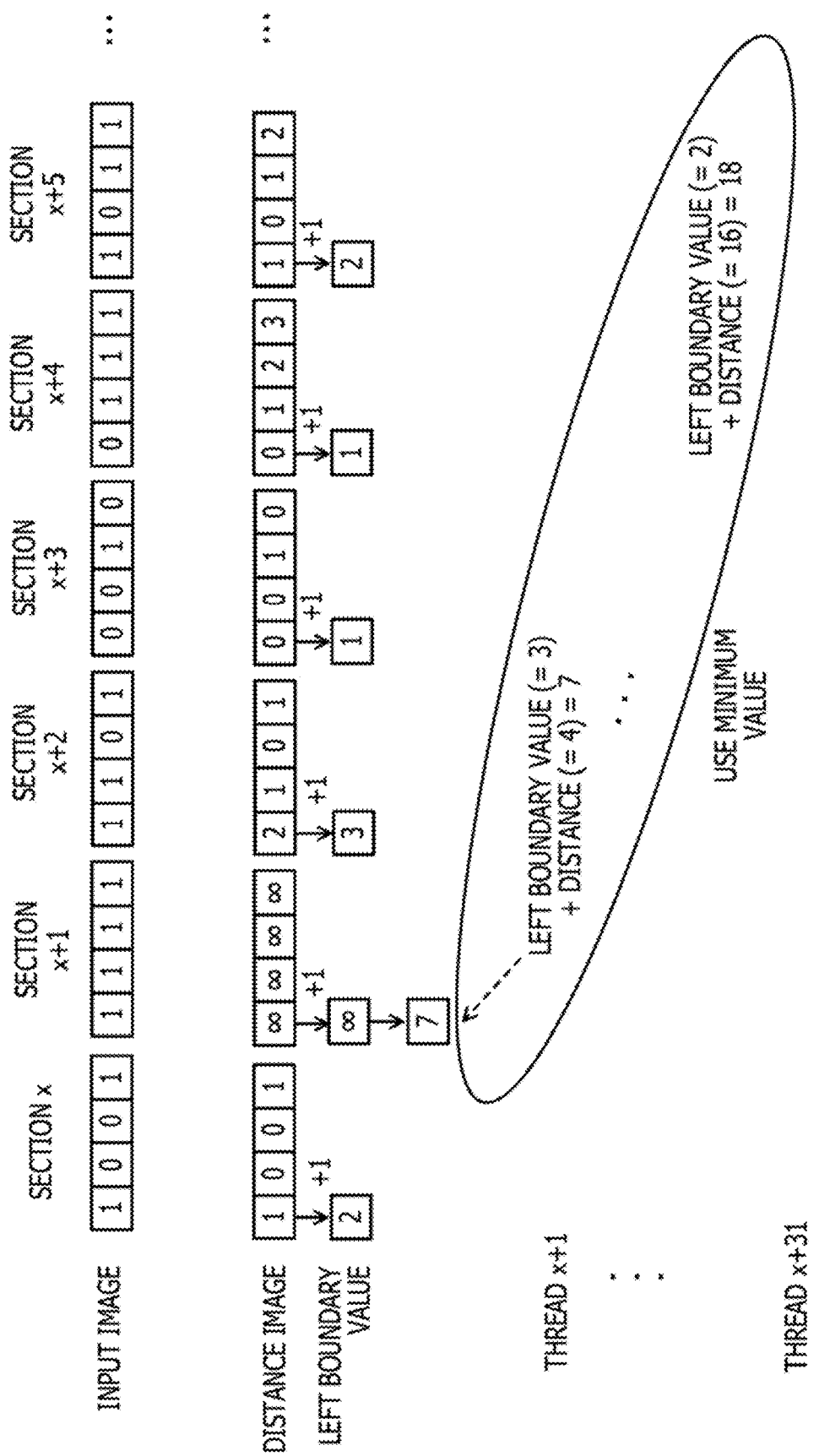
FIG. 13 is a diagram illustrating an example of calculation of left boundary values performed by the row-direction reduction unit.

FIG. 13 is a diagram illustrating an example of calculation of the left boundary values performed by the row-direction reduction unit 35. The row-direction reduction unit 35 stores a smaller value among the current left boundary value of a certain section and the minimum value of values each obtained by adding a distance from another section (a section on the right side of the certain section) to the certain section to the left boundary value of the another section, as a new left boundary value of the certain section.

For example, for the section x+1, the row-direction reduction unit 35 sets a smaller value among the current left boundary value of the section x+1 and the minimum value of values obtained by adding respective distances to the section x+1 to the corresponding left boundary values of sections from the section x+2 to the section x+31, as the new left boundary value of the section x+1. In the example illustrated in FIG. 13, for example, a value "7" obtained by adding the distance (4) to the section x+1 to the left boundary value (3) of the section x+2 is stored as the new left boundary value of the section x+1.

FIG. 13 illustrates the calculation of the left boundary value of the section x+1. However, substantially the same processing is performed for all the sections.

For the processing illustrated in FIGS. 12 and 13, each thread may reduce the number of times of calculations by calculating the boundary values of the corresponding section being processed by using the calculation results of the boundary values in the another sections. For example, as illustrated in FIG. 13, calculation of "the left boundary value+the distance" is performed for 30 sections from the section x+1 to the section x+31 to update the left boundary value of the section x+1. However, one thread is not required to perform the calculation 30 times. The reduction in the number of times of calculations will be described in detail later.

FIGS. 14 and 15 are diagrams illustrating an example of the processing performed by the row-direction reduction unit 35. As illustrated in FIGS. 14 and 15, the same numerical value is assigned as the section ID and the thread ID. It is assumed that the number of pixels in each section is denoted by E and the right boundary value in the section is denoted by R(n) (n: section ID).

The row-direction reduction unit 35 initializes D(n) to co with each thread. It is assumed that the value used for the initialization does not have to be co and may be a value that is sufficiently large and does not exist as an element of the distance image. The row-direction reduction unit 35 substitutes the right boundary value R(n−1)+E into D(n) with each thread. The calculation processing performed by a thread 17 will be described in detail below.

The row-direction reduction unit 35 updates D17 to min(D17, D15+E×2) in calculation processing 1. Therefore, the calculation results of the sections 16 and 14 are used in the calculation of D17 at the time of the calculation processing 1.

The row-direction reduction unit 35 then updates D17 to min(D17, D13+E×4) in calculation processing 2. D13 is a calculation result of min(D13, D11+E×2) in the calculation processing 1 performed by a thread 13. The calculation results of the sections 12 and 10 are used in the calculation result of D13. Therefore, the calculation results of the sections 16, 14, 12, and 10 are used in the calculation of D17 when the calculation processing 2 is finished.

The row-direction reduction unit 35 then updates D17 to min(D17, D9+E×8) in calculation processing 3. D9 is a calculation result of min(D9, D5+E×4) in the calculation processing 2 performed by a thread 9. The boundary values of the sections 8, 6, 4, and 2 are used in the calculation result of D9. Therefore, the boundary values of the sections 16, 14, 12, 10, 8, 6, 4, and 2 are used in the calculation of D17 when the calculation processing 3 is finished.

The row-direction reduction unit 35 then updates D17 to min(D17, D1+E×16) in calculation processing 4. D1 is a processing result of processing up to the calculation processing 3 performed by a thread 1. In the thread 1, the calculation processing 1 to 3 is not performed. However, R0+E is substituted into D1 in the initial setting. Therefore, the boundary values of the sections 16, 14, 12, 10, 8, 6, 4, 2, and 0 are used in the calculation of D17 when the calculation processing 4 is finished.

The row-direction reduction unit 35 then updates D17 to min(D17, D16+E)−E in calculation processing 5. D16 is a processing result of processing up to the calculation processing 4 performed by a thread 16. The boundary values of the sections 15, 13, 11, 9, 7, 5, 3, and 1 are used in the calculation result of D16. Therefore, the boundary values of the sections 0 to 16 are used in the calculation of D17 when the calculation processing 5 is performed.

In the calculation processing 5, "−E" is calculated as illustrated in FIGS. 14 and 15. In the initial setting, R(n−1)+E is substituted into D(n). Thus, by calculating "—E" last, D(n) that is the calculation result of the calculation processing 5 is equivalent to an updated R(n−1).

As a result of the calculation processing 1 to 5, D17 becomes equal to min(D16, D15+E, D14+E×2, D13+E×3, D12+E×4, . . . , D0+E×16). For example, D(n) which is the right boundary value in a scope of the entire row is calculated. Although the processing performed by the thread 17 has been described, the right boundary value is calculated by using substantially the same algorithm by the other threads.

As described above, the row-direction reduction unit 35 updates the right boundary value of the certain section by using the minimum value of values obtained by adding the respective distances from the certain section to the another sections to the corresponding right boundary values of the another other sections. As illustrated in FIGS. 14 and 15, when the number of sections is equal to 32, the number of times each thread performs the calculation processing is equal to five times in total. In calculating each boundary value, the row-direction reduction unit 35 performs the calculation using the calculation results of the boundary values in the another sections. Consequently, the row-direction reduction unit 35 may calculate the boundary values with a less amount of calculation processing. Although updating of the right boundary values performed by the row-direction reduction unit 35 has been described, updating of the left boundary values is also performed in a similar manner.

The number of sections and the number of threads do not have to be 32. For example, when the number of sections is denoted by n, the number of times of calculations is denoted by Log 2(n).

For example, it is assumed that the processor of the image conversion apparatus 3 enables a plurality of threads in the same group to share the same program counter and is capable of allocating a certain number of threads in a single group. In this case, the allocation unit 31 partitions pixel values in each row of the input image into the certain number of sections and allocates the threads to the respective sections. The allocation unit 31 partitions pixel values in each column of the distance image E into the certain number of sections and allocates threads to the respective sections. Accordingly, the row-direction reduction unit 35 and the column-direction reduction unit 40 do not have to perform synchronization processing between the threads.

It is assumed that the processor of the image conversion apparatus 3 enables each thread to refer to variables of the other threads in the same group via a register and is capable of allocating a certain number of threads in a single group. In this case, the allocation unit 31 partitions pixel values in each row of the input image into the certain number of sections and allocates threads to the respective sections of the row. The allocation unit 31 partitions pixel values in each column of the distance image E into the certain number of sections and allocates threads to the respective sections. Accordingly, the row-direction reduction unit 35 and the column-direction reduction unit 40 may perform processing at a high speed.

The processing performed by the row-direction reduction unit 35 and the column-direction reduction unit 40 will be described in more detail below. As described above, the allocation unit 31 extracts a row or column of the input image, and partitions the row or column into 32 sections. The number of sections may be changed depending on a central processing unit (CPU) or GPU of interest. It is assumed that the number of elements per section is denoted by E. The allocation unit 31 allocates 32 threads to 32 sections. The threads operate for the respective sections in parallel. In each of the sections, the right boundary value and the left boundary value are determined as a result of E forward scans (in a direction from left to right) and E backward scans (in a direction from right to left), respectively. The right boundary value and the left boundary value are equal to a distance from the right end element in the section to the element having the value of 0 and a distance from the left end element in the section to the element having the value of 0, respectively. Let R(0), R(1), R(2), . . . , R(31) denote the right boundary values of the respective sections. Let L(0), L(1), L(2), . . . , L(31) denote the left boundary values of the respective sections.

The basic form of the row-direction reduction unit 35 will be described below. It is assumed that the processing performed by the column-direction reduction unit 40 is similar to that of the row-direction reduction unit 35. The row-direction reduction unit 35 uses the right boundary values of the individual sections to search for a section having the value of 0 from among section(s) located on the left side of the section of interest and determines the shortest distance thereto. Likewise, the row-direction reduction unit 35 uses the left boundary values of the individual sections to search for a section having the value of 0 from among section(s) located on the right side of the section of interest and determines the shortest distance thereto. For example, when the section 31 is set as the section of interest, the row-direction reduction unit 35 searches for section(s) having the value of 0 from among L(0), L(1), L(2), . . . , L(30), and determines L(x) that is at the closest distance from the section 31. Since L(0), L(1), . . . , L(30) are separate from the section 31 by E*30, E*29, . . . , E*1, respectively, the shortest distance is determined using the distances obtained by adding E*30, E*29, . . . , E*1.

In the row-direction reduction unit 35, 32 threads allocated to 32 sections operate for the respective sections in parallel. To determine the shortest distance in a short processing time, the threads perform the processing while sharing data thereof. When the shortest distance to a section on the left side of each section is searched for, the respective threads are allocated to the section 0, the section 1, the section 2, . . . , and the section 31 as the section of interest thereof. Let n denote the section of interest assigned to each thread. In this case, the operation is performed in the following manner.

The initial setting illustrated in FIGS. 14 and 15 will be described. The row-direction reduction unit 35 acquires the right boundary value R(n−1) of the section immediately adjacent to the section of interest n, and substitutes R(n−1)+E into D(n). The reason for adding E is that the section immediately adjacent to the section of interest n is separate from the section of interest n by E. The row-direction reduction unit 35 performs the following calculations in parallel.

$$D(0)=\infty \ D(1)=R(0)+E \ D(2)=R(1)+E \text{(omitted)} D(31)=R(30)+E$$

For example, the row-direction reduction unit 35 performs calculation of equation (3-1) below with each thread.

$$D(n)=R(n-1)+E \quad (3\text{-}1)$$

The calculation processing 1 illustrated in FIGS. 14 and 15 will be described. The row-direction reduction unit 35 acquires D(n−2) of the section that is two sections away from the section of interest n, selects the minimum value among D(n−2)+E*2 and D(n), and substitutes the selected minimum value into D(n). From equation (3-1), R(n−3)+E is substituted into D(n−2) calculated by another thread. In order to convert the distance into the distance from the section of interest n, the row-direction reduction unit 35 modifies D(n−2) to D(n−2)+E*2.

From equation (3-1), R(n−1)+E is substituted into D(n). Accordingly, the row-direction reduction unit 35 performs calculation of equation (3-2) below with each thread.

$$D(n)=\text{Min}[D(n-2)+E^*2,D(n)]=\text{Min}[R(n-3)+E^*3,R(n-1)+E] \quad (3\text{-}2)$$

The calculation processing 2 illustrated in FIGS. 14 and 15 will be described. The row-direction reduction unit 35 acquires D(n−4) of the section that is four sections away from the section of interest n, selects the minimum value among D(n−4)+E*4 and D(n), and substitutes the selected minimum value into D(n). For example, from equation (3-2), Min[R(n−7)+E*3, R(n−5)+E] is substituted into D(n−4) calculated by another thread. To convert the distance into the distance from the section of interest n, the row-direction reduction unit 35 modifies the comparison target to D(n−4)+E*4.

From equation (3-2), Min[R(n−3)+E*3, R(n−1)+E] is substituted into D(n). Accordingly, the row-direction reduction unit 35 performs calculation of equation (3-3) below with each thread.

$$\begin{aligned} D(n) &= \text{Min}[D(n-4)+E^*4, D(n)] \\ &= \text{Min}[\text{Min}[R(n-7)+E^*7, R(n-5)+E^*5], \\ &\quad \text{Min}[R(n-3)+E^*3, R(n-1)+E]] \\ &= \text{Min}[R(n-7)+E^*7, R(n-5)+E^*5, R(n-3)+ \\ &\quad E^*3, R(n-1)+E] \end{aligned} \quad (3\text{-}3)$$

The calculation processing 3 illustrated in FIGS. 14 and 15 will be described. The row-direction reduction unit 35 acquires D(n−8) of the section that is eight sections away from the section of interest n, selects the minimum value among D(n−8)+E*8 and D(n), and substitutes the selected minimum value into D(n). From equation (3-3), Min[R(n−15)+E*7, R(n−13)+E*5, R(n−11)+E*3, R(n−9)+E] is substituted into D(n−8) calculated by another thread. To convert the distance into the distance from the section of interest n, the row-direction reduction unit 35 modifies the comparison target to D(n−8)+E*8.

From equation (3-3), Min[R(n−7)+E*7, R(n−5)+E*5, R(n−3)+E*3, R(n−1)+E] is substituted into D(n). Accordingly, the row-direction reduction unit 35 performs calculation of equation (3-4) below with each thread.

$$D(n) = \text{Min}[D(n-8) + E^*8, D(n)] \quad (3\text{-}4)$$
$$= \text{Min}[\text{Min}[R(n-15) + E^*15, R(n-13) + E^*13,$$
$$R(n-11) + E^*11, R(n-9) + E^*9],$$
$$\text{Min}[R(n-7) + E^*7, R(n-5) + E^*5,$$
$$R(n-3) + E^*3, R(n-1) + E]]$$
$$= \text{Min}[R(n-15) + E^*15, R(n-13) + E^*13,$$
$$R(n-11) + E^*11, R(n-9) + E^*9,$$
$$R(n-7) + E^*7, R(n-5) + E^*5,$$
$$R(n-3) + E^*3, R(n-1) + E]$$

The calculation processing 4 illustrated in FIGS. 14 and 15 will be described. The row-direction reduction unit 35 acquires D(n−16) of the section that is 16 sections away from the section of interest n, selects the minimum value among D(n−16)+E*16 and D(n), and substitutes the selected minimum value into D(n). From equation (3-4), Min[R(n−31)+E*15, R(n−29)+E*13, R(n−27)+E*11, R(n−25)+E*9, R(n−23)+E*7, R(n−21)+E*5, R(n−19)+E*3, R(n−17)+E] is substituted into D(n−16) calculated by another thread. To convert the distance into the distance from the section of interest n, the row-direction reduction unit 35 modifies the comparison target to D(n−16)+E*16.

From equation (3-4), Min[R(n−15)+E*15, R(n−13)+E*13, R(n−11)+E*11, R(n−9)+E*9, R(n−7)+E*7, R(n−5)+E*5, R(n−3)+E*3, R(n−1)+E] is substituted into D(n). Therefore, the row-direction reduction unit 35 performs calculation of equation (3-5) below with each thread.

$$D(n) = \text{Min}[D(n-16) + E^*16, D(n)] \quad (3\text{-}5)$$
$$= \text{Min}[\text{Min}[R(n-31) + E^*31, R(n-29) + E^*29,$$
$$R(n-27) + E^*27, R(n-25) + E^*25,$$
$$R(n-23) + E^*23, R(n-21) + E^*21,$$
$$R(n-19) + E^*19, R(n-17) + E^*17],$$
$$\text{Min}[R(n-15) + E^*15, R(n-13) + E^*13,$$
$$R(n-11) + E^*11, R(n-9) + E^*9,$$
$$R(n-7) + E^*7, R(n-5) + E^*5,$$
$$R(n-3) + E^*3, R(n-1) + E]]$$
$$= \text{Min}[R(n-31) + E^*31, R(n-29) + E^*29,$$
$$R(n-27) + E^*27, R(n-25) + E^*25,$$
$$R(n-23) + E^*23, R(n-21) + E^*21,$$
$$R(n-19) + E^*19, R(n-17) + E^*17,$$
$$R(n-15) + E^*15, R(n-13) + E^*13,$$
$$R(n-11) + E^*11, R(n-9) + E^*9,$$
$$R(n-7) + E^*7, R(n-5) + E^*5,$$
$$R(n-3) + E^*3, R(n-1) + E]$$

The calculation processing 5 illustrated in FIGS. 14 and 15 will be described. To take the distance between the even-numbered sections into consideration, the row-direction reduction unit 35 acquires D(n−1), selects the minimum value among D(n−1)+E and D(n), and substitutes the selected minimum value into D(n). From equation (3-5), Min[R(n−30)+E*29, R(n−28)+E*27, R(n−26)+E*25, R(n−24)+E*23, R(n−22)+E*21, R(n−20)+E*19, R(n−18)+E*17, R(n−16)+E*15, R(n−14)+E*13, R(n−12)+E*11, R(n−10)+E*9, R(n−8)+E*7, R(n−6)+E*5, R(n−4)+E*3, R(n−2)+E] is substituted into D(n−1). To convert the distance into the distance from the section of interest n, the row-direction reduction unit 35 modifies the comparison target to D(n−1)+E*1.

From equation (3-5), Min[R(n−31)+E*31, R(n−29)+E*29, R(n−27)+E*27, R(n−25)+E*25, R(n−23)+E*23, R(n−21)+E*21, R(n−19)+E*19, R(n−17)+E*17, R(n−15)+E*15, R(n−13)+E*13, R(n−11)+E*11, R(n−9)+E*9, R(n−7)+E*7, R(n−5)+E*5, R(n−3)+E*3, R(n−1)+E] is substituted into D(n).

Accordingly, the row-direction reduction unit 35 performs calculation of equation (3-6) below with each thread.

$$D(n) = \text{Min}[D(n-1) + E, D(n)] - E \quad (3\text{-}6)$$
$$= \text{Min}[R(n-31) + E^*31, R(n-30) + E^*30,$$
$$R(n-29) + E^*29, R(n-28) + E^*28,$$
$$R(n-27) + E^*27, R(n-26) + E^*26,$$
$$R(n-25) + E^*25, R(n-24) + E^*24,$$
$$R(n-23) + E^*23, R(n-22) + E^*22,$$
$$R(n-21) + E^*21, R(n-20) + E^*20,$$
$$R(n-19) + E^*19, R(n-18) + E^*18,$$
$$R(n-17) + E^*17, R(n-16) + E^*16,$$
$$R(n-15) + E^*15, R(n-14) + E^*14,$$
$$R(n-13) + E^*13, R(n-12) + E^*12,$$
$$R(n-11) + E^*11, R(n-10) + E^*10,$$
$$R(n-9) + E^*9, R(n-8) + E^*8,$$
$$R(n-7) + E^*7, R(n-6) + E^*6,$$
$$R(n-5) + E^*5, R(n-4) + E^*4,$$
$$R(n-3) + E^*3, R(n-2) + E^*2,$$
$$R(n-1) + E] - E$$

Since the calculation processing up to the calculation processing 4 is calculation based on the adjacent sections, the value with respect to the left end of the section of interest n is obtained by performing −E last.

Figure 16:
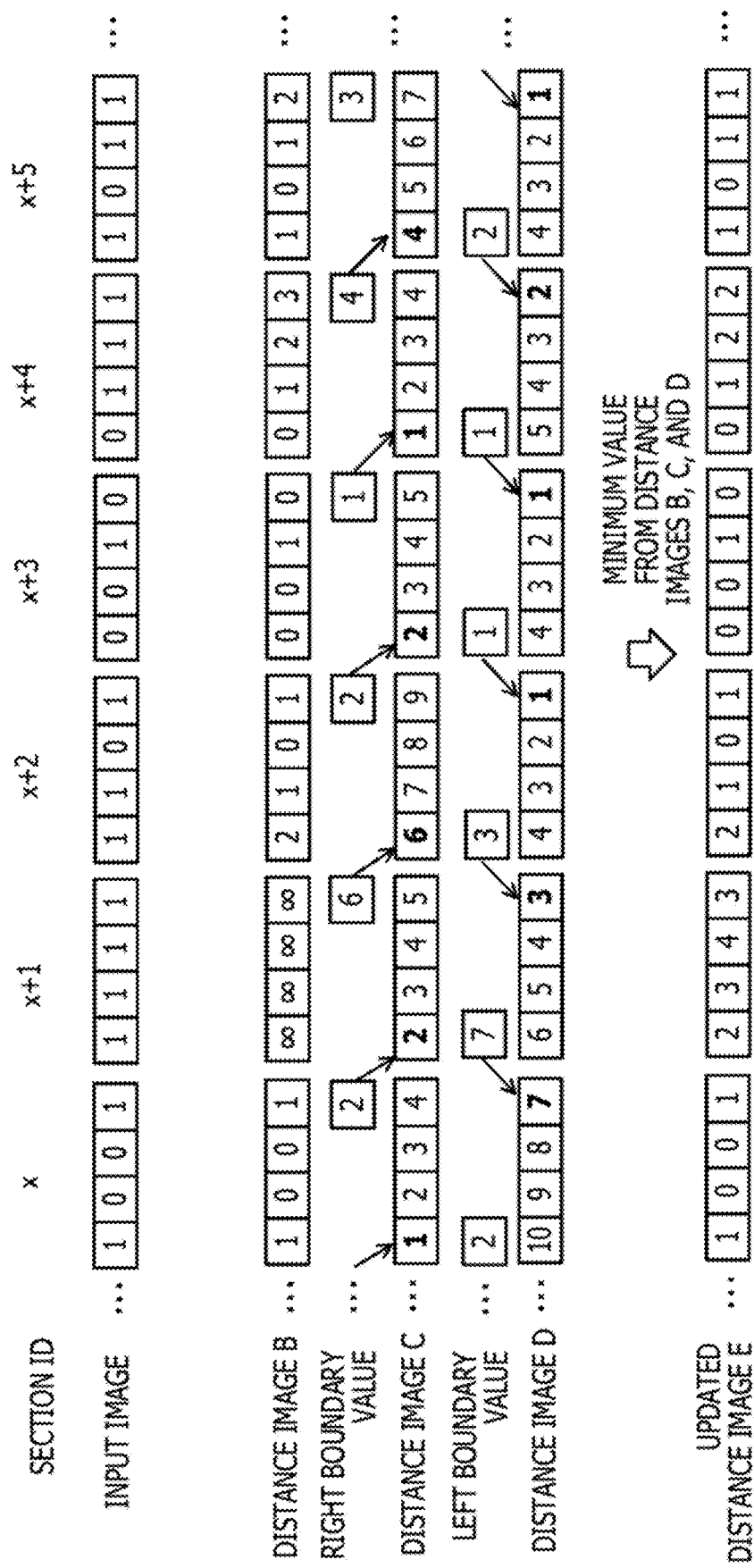
FIG. 16 is a diagram illustrating an example of processing performed by a row-direction summing unit.

FIG. 16 is a diagram illustrating an example of the processing performed by the row-direction summing unit 36. The input image and the distance image B illustrated in FIG. 16 have contents that are the same as those illustrated in FIG. 11. The right boundary values are the same as the contents illustrated in FIG. 12, and the left boundary values are the same as the contents illustrated in FIG. 13.

The row-direction summing unit 36 generates the distance image C indicating distances from the respective zero-pixels in the another sections based on the right boundary values. The row-direction summing unit 36 stores the right boundary value of the certain section in the pixel at the left end of the section located on the right of the certain section, and stores continuous values from the value at the left end in the respective pixels. As illustrated in FIG. 16, for example, the pixels in the section x+1 of the distance image C have the right boundary value of the section x, (the right boundary value of the section x)+1, (the right boundary value of the section x)+2, and (the right boundary value of the section x)+3.

Likewise, the row-direction summing unit 36 generates the distance image D indicating distances from the respective zero-pixels in the another sections based on the left boundary values. The row-direction summing unit 36 stores the left boundary value of the certain section in the pixel at the right end of the section located on the left of the certain section, and stores continuous values from the value at the right end in the respective pixels. As illustrated in FIG. 16, for example, the pixels in the section x have (the left boundary value of the section x+1)+3, (the left boundary value of the section x+1)+2, (the left boundary value of the section x+1)+1, and the left boundary value of the section x+1.

The row-direction summing unit 36 outputs the minimum values of the pixels in the distance images B, C, and D as the updated distance image E.

Figure 17:
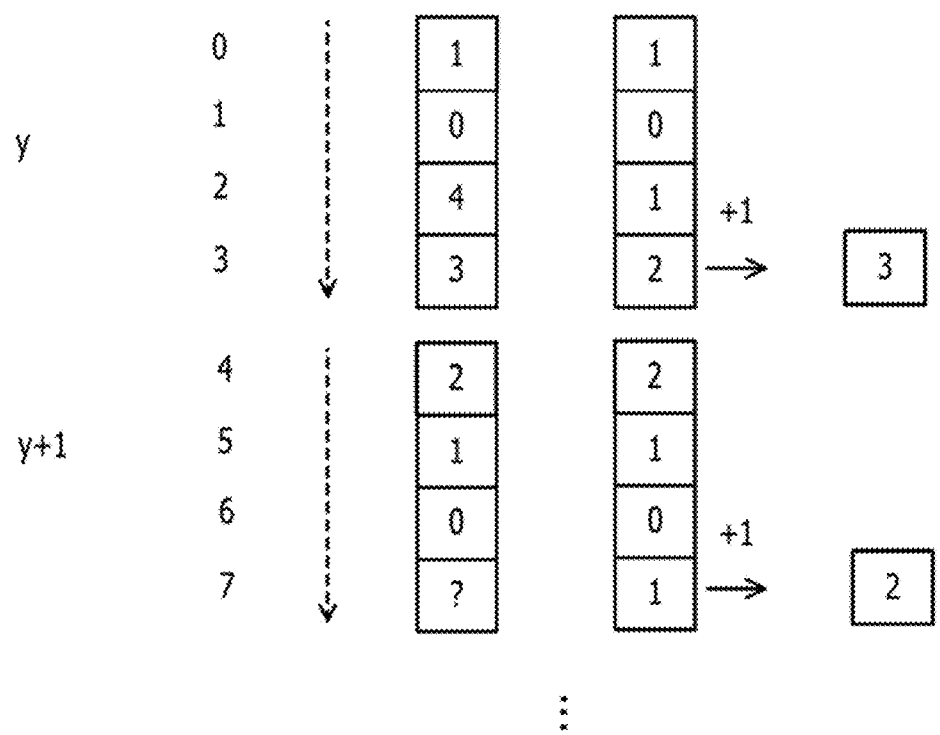
FIG. 17 is a diagram illustrating an example of column forward scan processing.

FIG. 17 is a diagram illustrating an example of column forward scan processing. The column forward scan unit 38 acquires the distance image E output from the row-direction summing unit 36 and performs a column forward scan to update the distance image E.

The column forward scan unit 38 stores a smaller value among a value obtained by adding 1 to the pixel value of the pixel scanned immediately before the pixel being scanned and a pixel value of the pixel being scanned in the distance image E, as the pixel value in the new distance image F. For example, in a row assigned the row number 0, there is no pixel scanned immediately before. Thus, the column forward scan unit 38 stores the pixel value in the distance image E as the pixel value in the new distance image F as it is. In a row assigned the row number 1, the column forward scan unit 38 stores a smaller value (0) among a value (2) obtained by adding 1 to the pixel value (1) of the pixel scanned immediately before the pixel being scanned and the pixel value (0) of the pixel being scanned in the distance image E, as the pixel value in the new distance image F.

In a row assigned the row number 2, the column forward scan unit 38 stores a smaller value (1) among a value (1) obtained by adding 1 to the pixel value (0) of the pixel scanned immediately before the pixel being scanned and the pixel value (4) of the pixel being scanned in the distance image E, as the pixel value in the new distance image F. In a row assigned the row number 3, the column forward scan unit 38 stores a smaller value (2) among a value (2) obtained by adding 1 to the pixel value (1) of the pixel scanned immediately before the pixel being scanned and the pixel value (3) of the pixel being scanned in the distance image E, as the pixel value in the new distance image F.

The column forward scan unit 38 performs substantially the same processing in each section to update the distance image E, and outputs the updated distance image F. The column forward scan unit 38 stores a value obtained by adding 1 to the pixel value at the lower end of each section, as a lower boundary value of the section.

Figure 18:
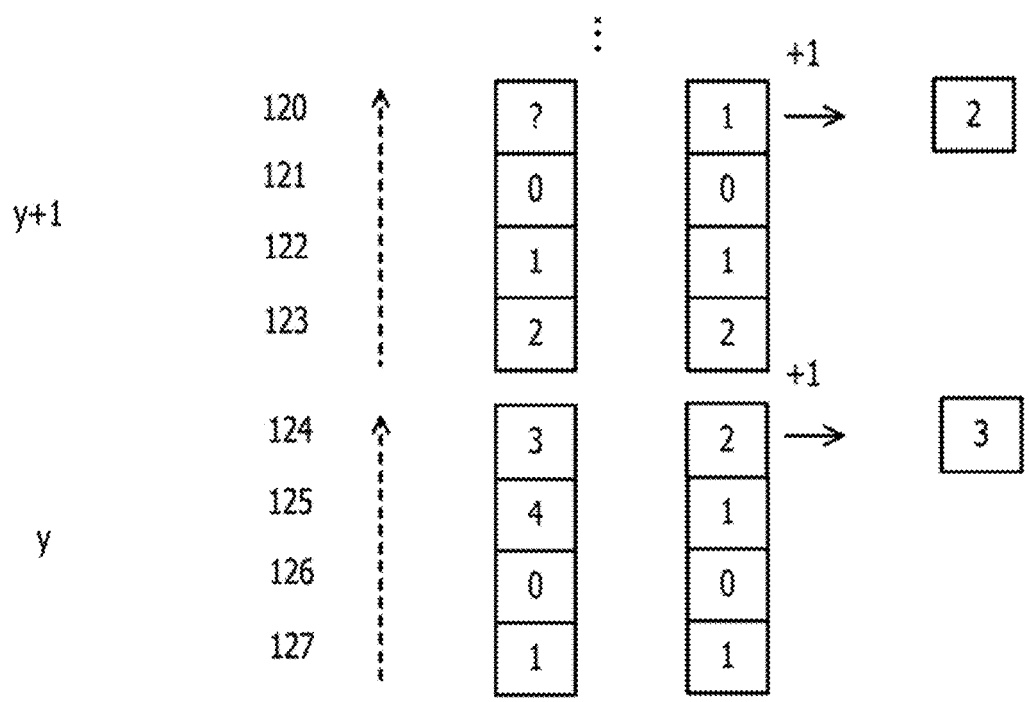
FIG. 18 is a diagram illustrating an example of column backward scan processing.

FIG. 18 is a diagram illustrating an example of column backward scan processing. The column backward scan unit 39 acquires the distance image F output by the column forward scan unit 38 and performs a column backward scan to update the distance image F.

The column backward scan unit 39 stores a smaller value among the value obtained by adding 1 to the pixel value of the pixel scanned immediately before the pixel being scanned and the pixel value of the pixel being scanned in the distance image F, as the pixel value in the new distance image G. In a row assigned the row number 127, there is no pixel scanned immediately before. Thus, the column backward scan unit 39 stores the pixel value in the distance image F as the pixel value in the new distance image G as it is. In a row assigned the row number 126, the column backward scan unit 39 stores a smaller value (0) among a value (2) obtained by adding 1 to the pixel value (1) of the pixel scanned immediately before the pixel being scanned and the pixel value (0) of the pixel being scanned in the distance image F, as the pixel value in the new distance image G.

In a row assigned the row number 125, the column backward scan unit 39 stores a smaller value (1) among a value (1) obtained by adding 1 to the pixel value (0) of the pixel scanned immediately before the pixel being scanned and the pixel value (4) of the pixel being scanned in the distance image F, as the pixel value in the new distance image G. In a row assigned the row number 124, the column backward scan unit 39 stores a smaller value (2) among a value (2) obtained by adding 1 to the pixel value (1) of the pixel scanned immediately before the pixel being scanned and the pixel value (3) of the pixel being scanned in the distance image F, as the pixel value in the new distance image G.

The column backward scan unit 39 performs substantially the same processing in each section to update the distance image F output by the column forward scan unit 38, and outputs the updated distance image G. The column backward scan unit 39 stores a value obtained by adding 1 to the pixel value at the upper end of each section, as an upper boundary value of the section.

The column-direction reduction unit 40 acquires the lower boundary values from the column forward scan unit 38. The column-direction reduction unit 40 then stores a smaller value among the current lower boundary value of a certain section and the minimum value of values each obtained by adding a distance from another section (a section on the upper side of the certain section) to the certain section to the lower boundary value of the another section, as the new lower boundary value of the certain section.

The column-direction reduction unit 40 acquires the upper boundary values from the column backward scan unit 39. The column-direction reduction unit 40 then stores a smaller value among the current upper boundary value of a certain section and the minimum value of values each obtained by adding a distance from another section (a section on the lower side of the certain section) to the certain section to the upper boundary value of the another section, as the new upper boundary value of the certain section. The processing performed by the column-direction reduction unit 40 is substantially the same as the processing performed by the row-direction reduction unit 35 illustrated in FIGS. 14 and 15 except that the direction is different.

The column forward scan unit 38 and the column backward scan unit 39 may perform transposition processing for transposing the rows and the columns of the distance image before performing the scanning. The processor is capable of performing the processing at a high speed when the pixels to be processed are arranged in the order of address. Therefore, when the address is continuously assigned in the row direction, the column forward scan unit 38 and the column backward scan unit 39 are capable of performing the processing at a high speed by performing the scan processing after transposing the distance image. For example, the row-direction summing unit 36 may transpose the distance image E before outputting the distance image E to the column-direction scan unit 37.

Figure 19:
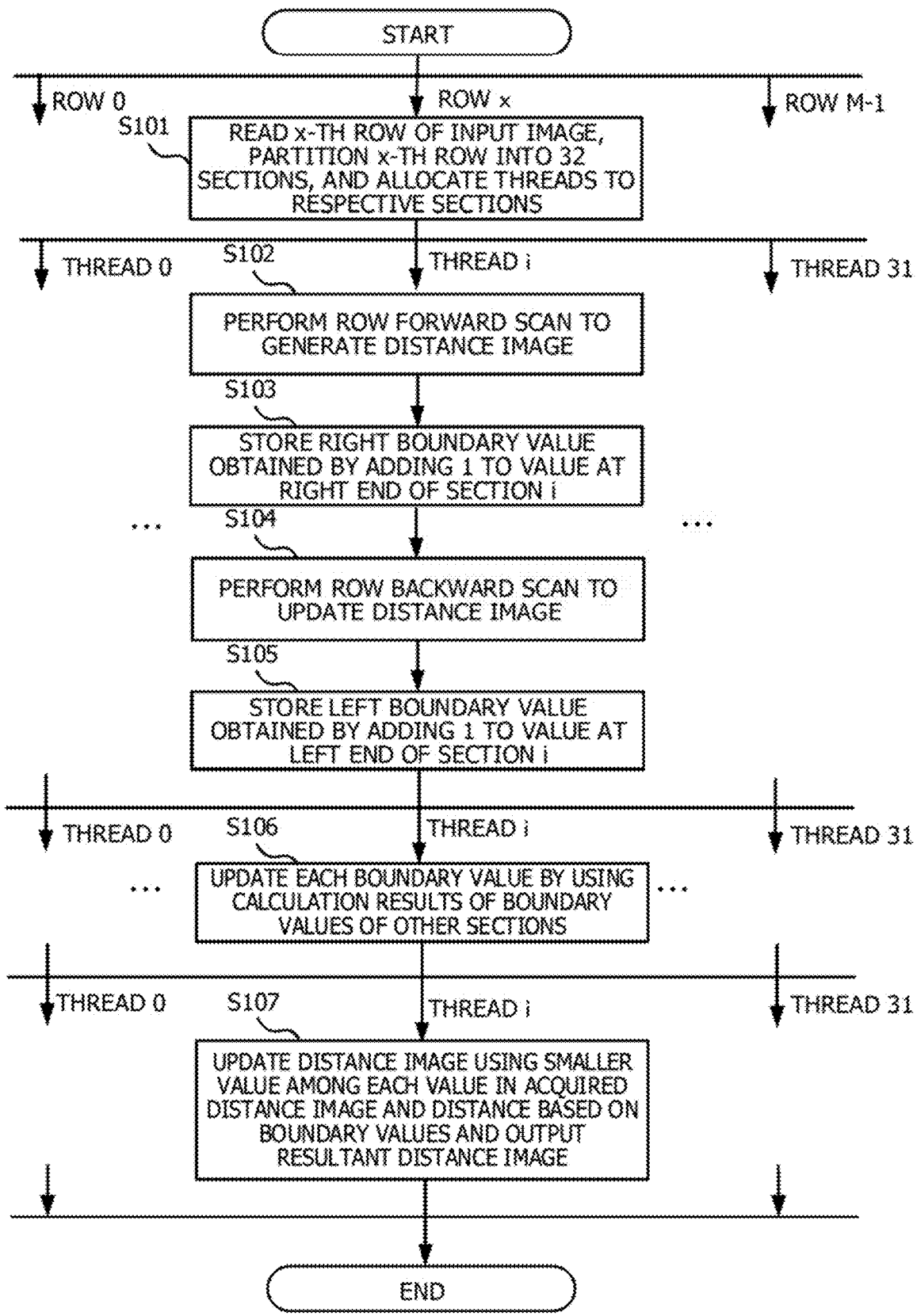
FIG. 19 is a flowchart illustrating an example of processing performed in a row direction in the embodiment.

FIG. 19 is a flowchart illustrating an example of processing performed in the row direction in the embodiment. As illustrated in FIG. 19, the image conversion apparatus 3 performs processing of step S101 for individual rows in parallel. Threads are allocated to respective sections of each row, and processing of steps S102 to S107 is performed by the threads in parallel. For example, M×32 (the number of rows×the number of sections) threads operate in parallel in steps S102 to S107.

The allocation unit 31 reads an x-th row of the input image, partitions the pixel values in the x-th row of the input image into 32 sections, and allocates threads to the respective sections (step S101).

The row forward scan unit 33 performs a forward scan for each section of the input image to calculate distances from a zero-pixel in the section of the input image, and generates the distance image A storing the calculation results (step S102). The row forward scan unit 33 then stores the value obtained by adding 1 to the pixel value at the right end of a section i, as the right boundary value of the section i (step S103).

The row backward scan unit 34 performs a row backward scan on the distance image A. The row backward scan unit 34 then updates the distance image A to the distance image B, by using a smaller value among a value obtained by adding 1 to the pixel value of the pixel scanned immediately before the pixel being scanned and a pixel value of the pixel being scanned in the distance image A (step S104). The row backward scan unit 34 then stores the value obtained by adding 1 to the pixel value at the left end of the section i, as the left boundary value of the section i (step S105).

The row-direction reduction unit 35 calculates and updates the right boundary value and the left boundary value indicating the distances from the zero-pixel in other sections, by using the calculation results of the right boundary values and the left boundary values in the other sections (step S106).

The row-direction summing unit 36 outputs the distance image E obtained by updating each value in the distance image B to a smaller value among the value in the distance image B acquired from the row backward scan unit 34 and the distance from the zero-pixel calculated based on the boundary values (the right boundary values and the left boundary values) (step S107).

Figure 20:
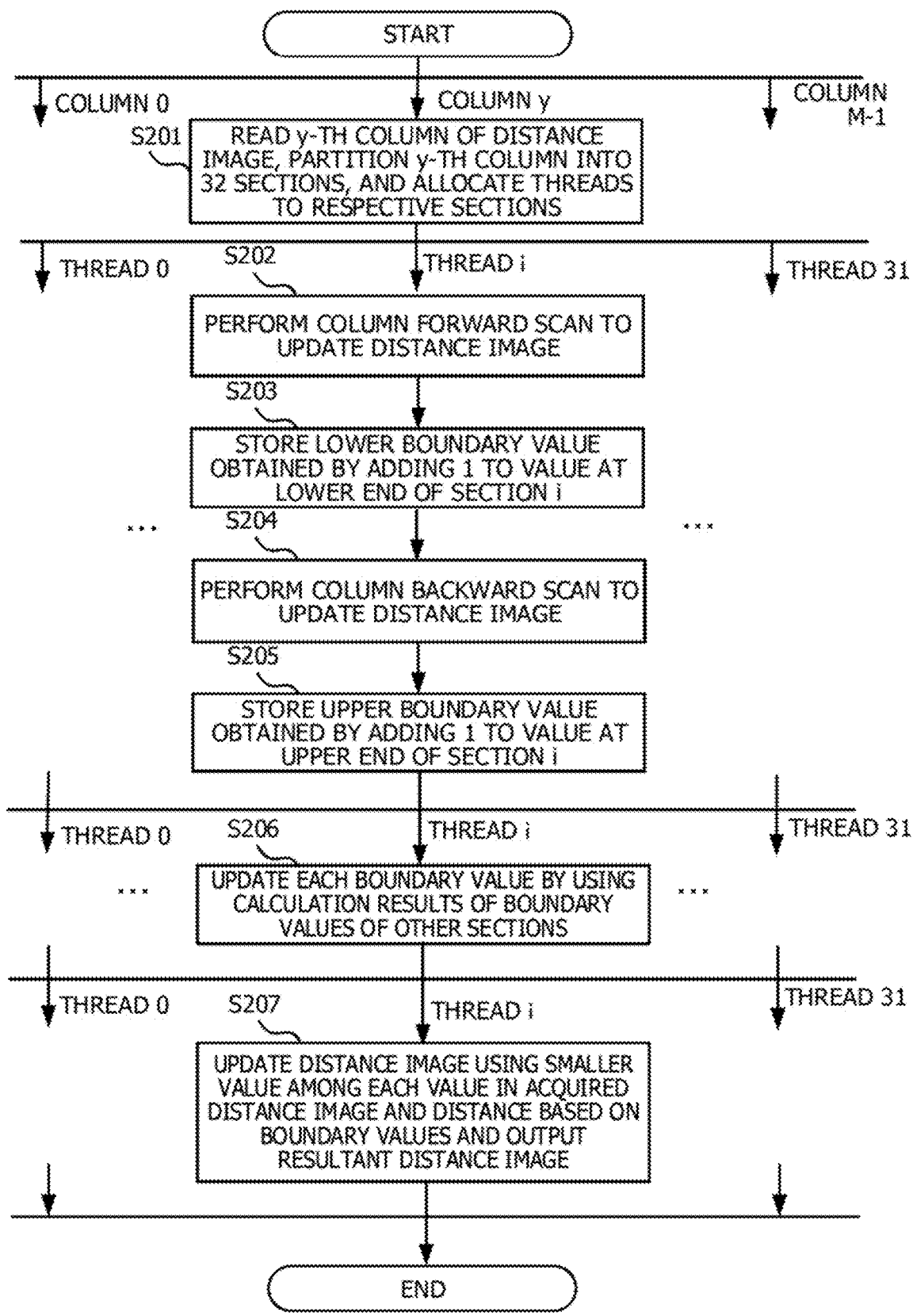
FIG. 20 is a flowchart illustrating an example of processing performed in a column direction in the embodiment.

FIG. 20 is a flowchart illustrating an example of processing performed in the column direction in the embodiment. As illustrated in FIG. 20, the image conversion apparatus 3 performs processing of step S201 for individual columns in parallel. Threads are allocated to respective sections of each column, and processing of steps S202 to S207 is performed by the threads in parallel. For example, N×32 (the number of columns×the number of sections) threads operate in parallel in steps S202 to S207.

The allocation unit 31 reads a y-th column of the input image, partitions pixel values in the y-th column of the input image into 32 sections, and allocates threads to the respective sections (step S201).

The column forward scan unit 38 performs a forward scan for each section of the distance image E output by the row-direction summing unit 36 to update the distance image E (step S202). The column forward scan unit 38 stores a smaller value among a value obtained by adding 1 to the pixel value of the pixel scanned immediately before the pixel being scanned and the pixel value of the pixel being scanned in the distance image E, as a pixel value in the new distance image F.

The column forward scan unit 38 then stores the value obtained by adding 1 to the pixel value at the lower end of the section i, as the lower boundary value of the section i (step S203).

The column backward scan unit 39 performs a column backward scan on the distance image F. The column backward scan unit 39 updates the distance image F to the distance image G, by using a smaller value among a value obtained by adding 1 to the pixel value of the pixel scanned immediately before the pixel being scanned and a pixel value of the pixel being scanned in the distance image F (step S204). The column backward scan unit 39 then stores the value obtained by adding 1 to the pixel value at the upper end of the section i, as the upper boundary value of the section i (step S205).

The column-direction reduction unit 40 calculates and updates the lower boundary value and the upper boundary value indicating the distances from the zero-pixel in the other sections, by using the calculation results of the lower boundary values and the upper boundary values in the other sections (step S206).

The column-direction summing unit 41 outputs the distance image H obtained by updating each value in the distance image G to a smaller value among the value in the distance image G acquired from the column backward scan unit 39 and the distance from the zero-pixel calculated based on the boundary values (the right boundary values and the left boundary values) (step S207).

FIG. 21 is a diagram illustrating the numbers of processes executed in parallel in the first related art, the second related art, and the embodiment. FIG. 21 illustrates the number of processes executed in parallel in the row-direction processing and the column-direction processing in the case where an image of 4K (3840×2160), an image of Full HD (1920×1080), and an image of HD (1280×720) are converted by using the first related art, the second related art, and the processing according to the embodiment.

For example, when the processing is performed in the row direction in the embodiment, the processing is performed for each row in parallel with 32 threads as illustrated in FIG. 19. Thus, the number of processes executed in parallel is equal to the number of rows×32. When the processing is performed in the column direction in the embodiment, the processing is performed for each column in parallel with 32 threads as illustrated in FIG. 20. Thus, the number of processes executed in parallel is equal to the number of columns×32.

When the processing according to the embodiment is used as illustrated in FIG. 21, the number of processes executed in parallel is greater than that of the first related art. Since the thread and the section are associated with each other as described above, a single pixel is not accessed by a plurality of threads. For this reason, the amount of access to each pixel and the amount of calculation in the embodiment are less than those of the second related art. Therefore, the image conversion apparatus 3 may perform image conversion with a small amount of access while effectively using the number of processes executable in parallel.

Figure 22:
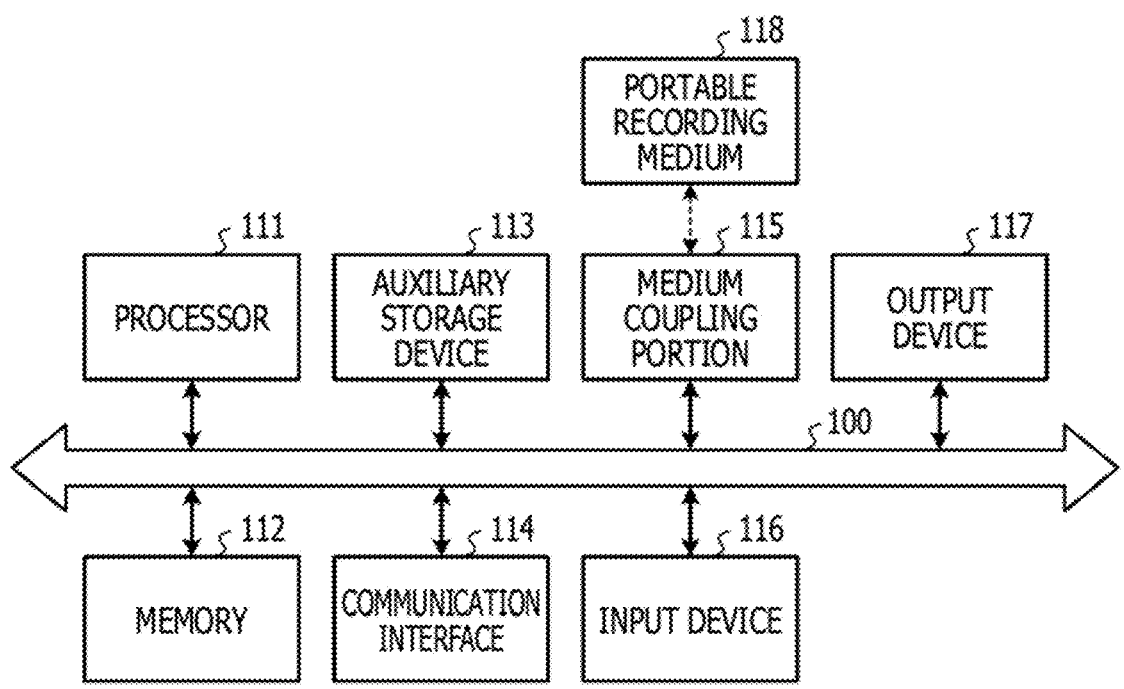
FIG. 22 is a diagram illustrating an example of a hardware configuration of the image conversion apparatus.

Next, an example of a hardware configuration of the image conversion apparatus 3 will be described. FIG. 22 is a diagram illustrating an example of a hardware configuration of the image conversion apparatus 3. As illustrated in the example of FIG. 22, in the image conversion apparatus 3, a processor 111, a memory 112, an auxiliary storage device 113, a communication interface 114, a medium coupling portion 115, an input device 116, and an output device 117 are coupled to a bus 100.

The processor 111 executes a program loaded to the memory 112. An image conversion program for causing the processing according to the embodiment to be performed may be used as the program to be executed. The processor 111 may be, for example, a GPU or CPU including a plurality of cores. For example, a register in the processor 111 is used as the first storage unit 42 illustrated in FIG. 10. For example, a shared memory, a global memory, or the like in the processor 111 is used as the second storage unit 43.

The memory 112 is, for example, a random-access memory (RAM). The auxiliary storage device 113 is a storage device that stores various kinds of information. For example, a hard disk drive, a semiconductor memory, or the like may be used as the auxiliary storage device 113. The image conversion program for causing the processing according to the embodiment to be performed may be stored in the auxiliary storage device 113.

The communication interface 114 is coupled to a communication network such as a local area network (LAN) or a wide area network (WAN), and performs data conversion and the like involved in communication.

The medium coupling portion 115 is an interface to which a portable recording medium 118 may be coupled. An optical disc (for example, a compact disc (CD) or a digital versatile disc (DVD)), a semiconductor memory, or the like may be used as the portable recording medium 118. The image conversion program for causing the processing according to the embodiment to be performed may be recorded on the portable recording medium 118.

The input device 116 is, for example, a keyboard, a pointing device, or the like, and accepts input of instructions and information from a user.

The output device 117 is, for example, a display device, a printer, a speaker, or the like, and outputs an inquiry or instruction to a user, a processing result, and so on. The output device 117 displays, for example, the distance image H output by the column-direction summing unit 41.

The second storage unit 43 illustrated in FIG. 10 may be implemented by the memory 112, the auxiliary storage device 113, the portable recording medium 118, or the like. The allocation unit 31, the row-direction scan unit 32, the row-direction reduction unit 35, the row-direction summing unit 36, the column-direction scan unit 37, the column-direction reduction unit 40, and the column-direction summing unit 41 illustrated in FIG. 10 may be implemented as a result of the processor 111 executing the image conversion program loaded to the memory 112.

The memory 112, the auxiliary storage device 113, and the portable recording medium 118 are non-transitory computer-readable tangible storage media and are not temporary media such as signal carriers.

Note that the image conversion apparatus 3 does not have to include all the components illustrated in FIG. 22, and some of the components may be omitted. Some components may be present in an external apparatus of the image conversion apparatus 3, and the image conversion apparatus 3 may be coupled to the external apparatus and utilize the components in the external apparatus.

The present disclosure is not limited to the embodiment described above, and various modifications, additions, and omissions may be made within a scope not departing from the gist of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
 a memory; and
 a processor coupled to the memory and configured to:
  partition pixel values in a unit of row of an input image into a plurality of sections and allocates threads to the respective sections of the row, the threads being enabled to run in parallel by a processor;
  calculate, with each of the threads allocated in each row, distances each from a pixel having a certain value in the corresponding section of the row in the input image, and generates a first distance image which stores values indicating the distances;
  calculate, with each of the threads allocated in each row, a first boundary value indicating a distance from a pixel having the certain value in another section of each row, by using a calculation result of the first boundary value in the another section of each row;
  output a second distance image obtained by updating, with each of the threads allocated in each row, each of the values in the first distance image to a smaller value among the value in the first distance image and a value indicating a distance from the pixel having the certain value calculated based on the first boundary values;
  partition pixel values in a unit of column of the second distance image into a plurality of sections and allocates threads to the respective sections of the column, the threads being enabled to run in parallel by the processor;
  calculate, with each of the threads allocated in each column, values indicating distances each from a pixel having the certain value in the corresponding section of the column based on pixel values in the second distance image, and generates a third distance image which stores the calculated values;
  calculate, with each of the threads allocated in each column, a second boundary value indicating a distance from a pixel having the certain value in another section of each column, by using a calculation result of the second boundary value in the another section of each column; and
  update, with each of the threads allocated in each column, each of the values in the third distance image to a smaller value among the value in the third distance image and a value indicating a distance from the pixel having the certain value calculated based on the second boundary values.

2. The information processing apparatus according to claim 1, wherein the processor is configured to:
 store, as the first boundary value of a certain section, a smaller value among a value obtained by adding 1 to a pixel value at an end of the certain section in each row and a minimum value of values each obtained by adding a distance from another section to the certain section in the row to the first boundary value of the another section in each row, and
 store, as a new second boundary value of a certain section in each column, a smaller value among a value obtained by adding 1 to a pixel value at an end of the certain section in the column and a minimum value of values each obtained by adding a distance from another section to the certain section in the column to the second boundary value of the another section in each column.

3. The information processing apparatus according to claim 1, wherein the processor is configured to:
enable a plurality of threads in a same group to share a same counter and is capable of allocating a certain number of threads in a single group,
partition pixel values in the unit of row of the input image into the certain number of sections and allocates threads to the respective sections of the row, and
partition pixel values in the unit of column of the second distance image into the certain number of sections and allocates threads to the respective sections of the column.

4. The information processing apparatus according to claim 1, wherein the processor is configured to:
enable each thread to refer to variables of other threads in a same group via a register and is capable of allocating a certain number of threads in a single group,
partition pixel values in the unit of row of the input image into the certain number of sections and allocates threads to the respective sections of the row, and
partition pixel values in the unit of column of the second distance image into the certain number of sections and allocates threads to the respective sections of the column.

5. A non-transitory computer-readable recording medium having stored therein an image conversion program for causing a computer to execute a process, the process comprising:
partitioning pixel values in a unit of row of an input image into a plurality of sections and allocating threads to the respective sections of the row, the threads being enabled to run in parallel by a processor;
with each of the threads allocated in each row, calculating distances each from a pixel having a certain value in the corresponding section of the row in the input image, and generating a first distance image which stores values indicating the distances;
calculating, with each of the threads allocated in each row, a first boundary value indicating a distance from a pixel having the certain value in another section of each row, by using a calculation result of the first boundary value in the another sections of each row;
outputting a second distance image obtained by updating, with each of the threads allocated in each row, each of the values in the first distance image to a smaller value among the value in the first distance image and a value indicating a distance from the pixel having the certain value calculated based on the first boundary values;
partitioning pixel values in a unit of column of the second distance image into a plurality of sections and allocating threads to the respective sections of the column, the threads being enabled to run in parallel by the processor;
with each of the threads allocated in each column, calculating values indicating distances each from a pixel having the certain value in the corresponding section of the column based on pixel values in the second distance image, and generating a third distance image which stores the calculated values;
calculating, with each of the threads allocated in each column, a second boundary value indicating a distance from a pixel having the certain value in another section of each column, by using a calculation result of the second boundary value in the another section of each column; and
updating, with each of the threads allocated in each column, each of the values in the third distance image to a smaller value among the value in the third distance image and a value indicating a distance from the pixel having the certain value calculated based on the second boundary values.

6. The non-transitory computer-readable recording medium according to claim 5, further comprising:
storing, as the first boundary value of a certain section, a smaller value among a value obtained by adding 1 to a pixel value at an end of the certain section in each row and a minimum value of values each obtained by adding a distance from another section to the certain section in the row to the first boundary value of the another section in each row, and
storing, as a new second boundary value of a certain section in each column, a smaller value among a value obtained by adding 1 to a pixel value at an end of the certain section in the column and a minimum value of values each obtained by adding a distance from another section to the certain section in the column to the second boundary value of the another section in each column.

7. The non-transitory computer-readable recording medium according to claim 5, further comprising:
enabling a plurality of threads in a same group to share a same counter and is capable of allocating a certain number of threads in a single group,
partitioning pixel values in the unit of row of the input image into the certain number of sections and allocates threads to the respective sections of the row, and
partitioning pixel values in the unit of column of the second distance image into the certain number of sections and allocates threads to the respective sections of the column.

8. The non-transitory computer-readable recording medium according to claim 5, further comprising:
enabling each thread to refer to variables of other threads in a same group via a register and is capable of allocating a certain number of threads in a single group,
partitioning pixel values in the unit of row of the input image into the certain number of sections and allocates threads to the respective sections of the row, and
partitioning pixel values in the unit of column of the second distance image into the certain number of sections and allocates threads to the respective sections of the column.

9. An image conversion method, comprising:
Partitioning, by a computer, pixel values in a unit of row of an input image into a plurality of sections and allocating threads to the respective sections of the row, the threads being enabled to run in parallel by a processor;
with each of the threads allocated in each row, calculating distances each from a pixel having a certain value in the corresponding section of the row in the input image, and generating a first distance image which stores values indicating the distances;
calculating, with each of the threads allocated in each row, a first boundary value indicating a distance from a pixel having the certain value in another section of each row, by using a calculation result of the first boundary value in the another section of each row;

outputting a second distance image obtained by updating, with each of the threads allocated in each row, each of the values in the first distance image to a smaller value among the value in the first distance image and a value indicating a distance from the pixel having the certain value calculated based on the first boundary values;

partitioning pixel values in a unit of column of the second distance image into a plurality of sections and allocating threads to the respective sections of the column, the threads being enabled to run in parallel by the processor;

with each of the threads allocated in each column, calculating values indicating distances each from a pixel having the certain value in the corresponding section of the column based on pixel values in the second distance image, and generating a third distance image which stores the calculated values;

calculating, with each of the threads allocated in each column, a second boundary value indicating a distance from a pixel having the certain value in another section of the column, by using a calculation result of the second boundary value in the another section of each column; and updating, with each of the threads allocated in each column, each of the values in the third distance image to a smaller value among the value in the third distance image and a value indicating a distance from the pixel having the certain value calculated based on the second boundary values.

10. The image conversion method according to claim 9, further comprising:

storing, as the first boundary value of a certain section, a smaller value among a value obtained by adding 1 to a pixel value at an end of the certain section in each row and a minimum value of values each obtained by adding a distance from another section to the certain section in the row to the first boundary value of the another section in each row, and storing, as a new second boundary value of a certain section in each column, a smaller value among a value obtained by adding 1 to a pixel value at an end of the certain section in the column and a minimum value of values each obtained by adding a distance from another section to the certain section in the column to the second boundary value of the another section in each column.

11. The image conversion method according to claim 9, further comprising:

enabling a plurality of threads in a same group to share a same counter and is capable of allocating a certain number of threads in a single group, partitioning pixel values in the unit of row of the input image into the certain number of sections and allocates threads to the respective sections of the row, and partitioning pixel values in the unit of column of the second distance image into the certain number of sections and allocates threads to the respective sections of the column.

12. The image conversion method according to claim 9, further comprising:

enabling each thread to refer to variables of other threads in a same group via a register and is capable of allocating a certain number of threads in a single group, partitioning pixel values in the unit of row of the input image into the certain number of sections and allocates threads to the respective sections of the row, and partitioning pixel values in the unit of column of the second distance image into the certain number of sections and allocates threads to the respective sections of the column.

* * * * *